US011773895B2

(12) United States Patent
Wilson et al.

(10) Patent No.: US 11,773,895 B2
(45) Date of Patent: Oct. 3, 2023

(54) SPRING NUT WITH RELEASE

(71) Applicant: ERICO INTERNATIONAL CORPORATION, Solon, OH (US)

(72) Inventors: Eric J. Wilson, Solon, OH (US); Raymond Scott Laughlin, Middlefield, OH (US)

(73) Assignee: ERICO International Corporation, Solon, OH (US)

( * ) Notice: Subject to any disclaimer, the term of this patent is extended or adjusted under 35 U.S.C. 154(b) by 587 days.

(21) Appl. No.: 16/864,229

(22) Filed: May 1, 2020

(65) Prior Publication Data

US 2020/0347871 A1 Nov. 5, 2020

Related U.S. Application Data

(60) Provisional application No. 62/841,722, filed on May 1, 2019.

(51) Int. Cl.
*F16B 37/08* (2006.01)
*F16B 37/04* (2006.01)

(52) U.S. Cl.
CPC ........ *F16B 37/0857* (2013.01); *F16B 37/046* (2013.01); *F16B 37/043* (2013.01)

(58) Field of Classification Search
CPC .. F16B 37/0857; F16B 37/046; F16B 37/043; F16B 37/0842; F16B 37/02
USPC ......................... 411/432, 433, 437
See application file for complete search history.

(56) References Cited

U.S. PATENT DOCUMENTS

| | | | |
|---|---|---|---|
| 2,408,153 A * | 9/1946 | Steans | F16B 37/02 411/929 |
| 3,841,196 A * | 10/1974 | Tinnerman | F16B 35/005 411/433 |
| 4,375,933 A | 3/1983 | Hassler et al. | |
| 4,440,535 A | 4/1984 | Oehlke | |
| 4,610,588 A | 9/1986 | Van Buren, Jr. et al. | |
| 4,729,706 A | 3/1988 | Peterson et al. | |
| 4,883,397 A | 11/1989 | Dubost | |
| 5,249,900 A | 10/1993 | Mitts | |
| 5,256,018 A | 10/1993 | Rattmann et al. | |
| 5,378,097 A | 1/1995 | Bamavol | |
| 5,694,719 A | 12/1997 | Bejune et al. | |
| 6,457,924 B1 | 10/2002 | Wallace | |

(Continued)

FOREIGN PATENT DOCUMENTS

| DE | 20319556 U1 | 3/2004 |
|---|---|---|
| DE | 102008007135 A1 | 6/2009 |

(Continued)

OTHER PUBLICATIONS

ARaymond Industrial Product Catalog, undated, www.araymond-industrial.com, 120 pages.

(Continued)

*Primary Examiner* — Victor D Batson
*Assistant Examiner* — Dil K. Magar
(74) *Attorney, Agent, or Firm* — Quarles & Brady LLP

(57) ABSTRACT

A spring nut for attaching a threaded object to a structure can include first and second arms extending from the base, and a wedge element. The wedge element can be configured to selectively operatively urge the first and second arms apart to release the threaded object from between the first and second arms.

20 Claims, 15 Drawing Sheets

(56) References Cited

U.S. PATENT DOCUMENTS

| | | | |
|---|---|---|---|
| 6,709,210 B2 | 3/2004 | Lowry et al. | |
| 6,760,231 B2 | 7/2004 | Hung et al. | |
| 6,896,464 B1 | 5/2005 | Vassiliou | |
| 6,899,498 B2 | 5/2005 | Lowry et al. | |
| 6,908,274 B1 | 6/2005 | Vassiliou | |
| 7,128,512 B2 | 10/2006 | Johnson et al. | |
| 7,204,666 B2 * | 4/2007 | Hullman | F16B 37/067 411/432 |
| 7,207,762 B2 | 4/2007 | Teal | |
| 7,226,260 B2 | 6/2007 | Jackson, Jr. et al. | |
| 7,399,151 B2 * | 7/2008 | Lubera | F16B 5/0657 411/524 |
| 7,568,868 B2 * | 8/2009 | Motsch | F16B 37/041 411/546 |
| 7,568,870 B2 * | 8/2009 | Paquet | F16B 37/043 411/125 |
| 7,572,089 B2 | 8/2009 | Lowry et al. | |
| 7,640,635 B2 | 1/2010 | Kim et al. | |
| 7,725,991 B2 | 6/2010 | Lubera et al. | |
| 7,789,606 B2 | 9/2010 | Kosidlo et al. | |
| 7,874,775 B2 | 1/2011 | Hullmann et al. | |
| 7,959,392 B2 | 6/2011 | Cooley | |
| 8,016,530 B2 * | 9/2011 | Johnson | F16B 37/043 411/173 |
| 8,210,786 B2 | 7/2012 | Okada et al. | |
| 8,240,964 B2 * | 8/2012 | Motsch | F16B 37/043 411/173 |
| 8,474,111 B2 | 7/2013 | Ribes Marti | |
| 8,627,552 B2 | 1/2014 | Smith et al. | |
| 8,790,056 B2 | 7/2014 | Fuentes et al. | |
| 9,156,414 B2 * | 10/2015 | Diez Herrera | F16B 37/043 |
| 9,346,593 B2 | 5/2016 | Dang | |
| 9,440,596 B2 * | 9/2016 | Huelke | F16B 2/241 |
| 9,533,718 B2 * | 1/2017 | Smith | B62D 27/02 |
| 9,562,554 B2 | 2/2017 | Vidal et al. | |
| 9,746,018 B2 | 8/2017 | Williams et al. | |
| 9,903,407 B2 | 2/2018 | Hattori et al. | |
| 10,024,353 B2 | 7/2018 | Dumas et al. | |
| 2004/0115028 A1 | 6/2004 | Lowry et al. | |
| 2004/0131442 A1 | 7/2004 | Dieckmann | |
| 2005/0220563 A1 | 10/2005 | Kosidlo et al. | |
| 2006/0245843 A1 * | 11/2006 | Yoneoka | F16B 37/0857 411/433 |
| 2008/0226417 A1 * | 9/2008 | Spitz | F16B 37/02 411/170 |
| 2008/0286066 A1 * | 11/2008 | Paquet | F16B 37/043 411/177 |
| 2010/0026028 A1 * | 2/2010 | Smith | F16B 37/043 296/29 |
| 2010/0310338 A1 | 12/2010 | Diez Herrera | |
| 2014/0259625 A1 | 9/2014 | Dumas et al. | |
| 2018/0222429 A1 * | 8/2018 | Marini | F16B 21/075 |
| 2018/0335072 A1 | 11/2018 | Wilson et al. | |
| 2022/0252101 A1 * | 8/2022 | Wilson | F16B 37/0842 |

FOREIGN PATENT DOCUMENTS

| | | |
|---|---|---|
| EP | 0432551 A3 | 6/1991 |
| EP | 0497084 B1 | 8/1992 |
| EP | 0778420 A1 | 11/1997 |
| EP | 0970313 A1 | 1/2000 |
| EP | 1017946 B1 | 7/2000 |
| EP | 1891342 B1 | 1/2009 |
| EP | 1903219 B1 | 7/2012 |
| EP | 2613062 A1 | 7/2013 |
| EP | 2657549 A2 | 10/2013 |
| EP | 2848827 A1 | 3/2015 |
| JP | 2006070973 A | 3/2006 |
| KR | 20040097036 A | 11/2004 |
| WO | 2011048994 A1 | 4/2011 |
| WO | 2012156271 A1 | 11/2012 |
| WO | 2018217750 A1 | 11/2018 |

OTHER PUBLICATIONS

Engineering Solutions Provided by ITW CIP, Mid Panel Threaded Fastener Guide, application data, undated, 9 pages.

* cited by examiner

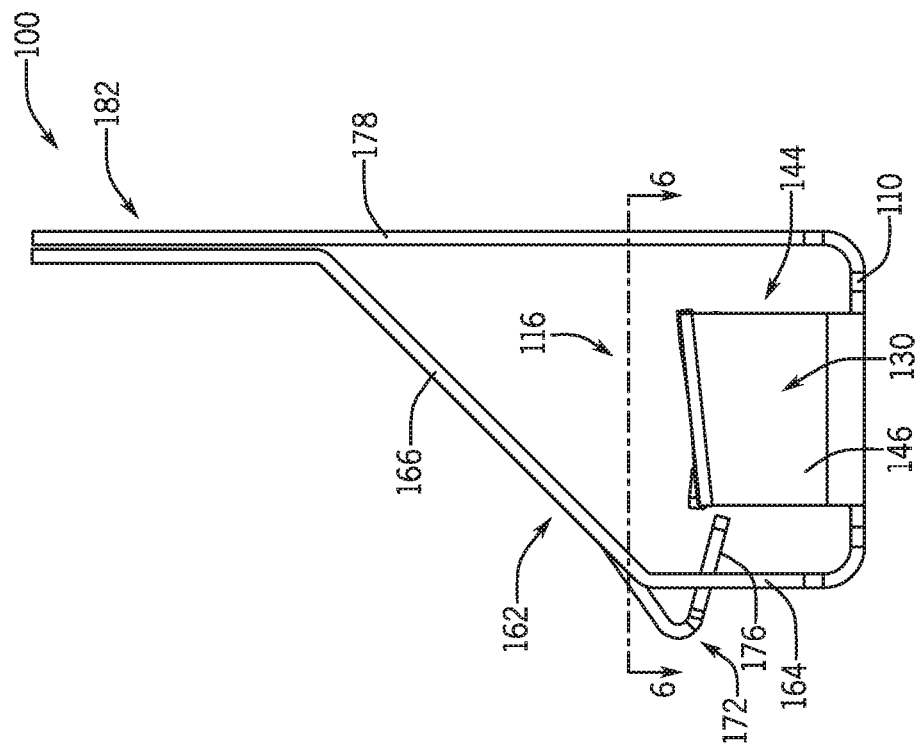
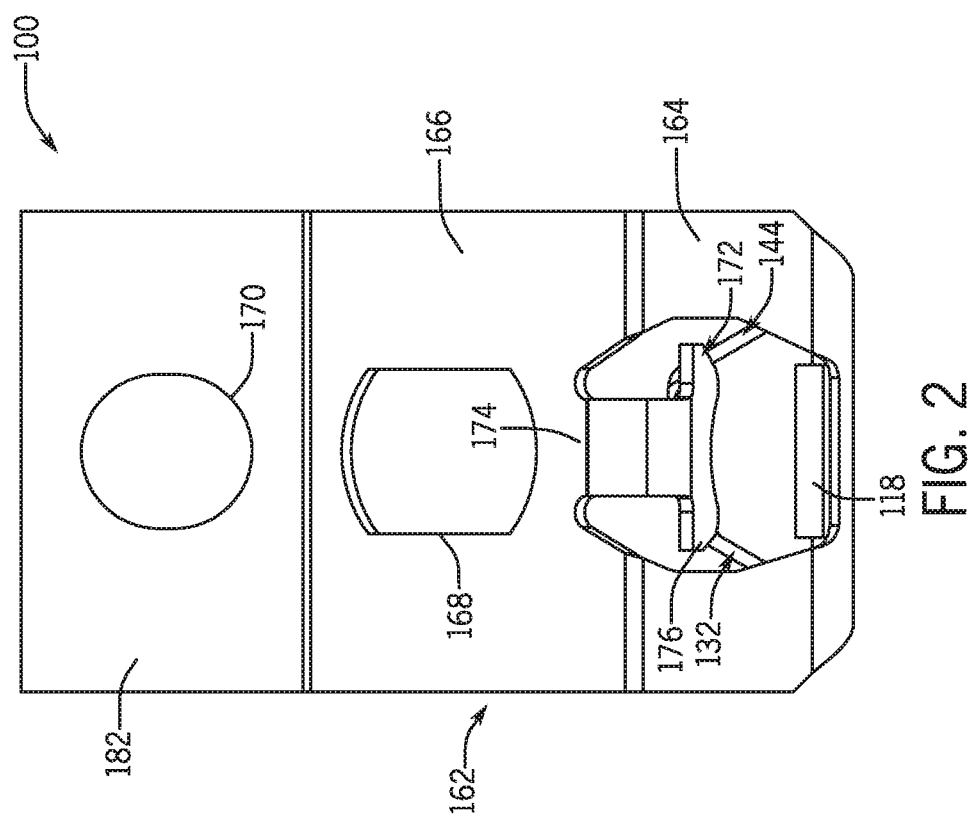

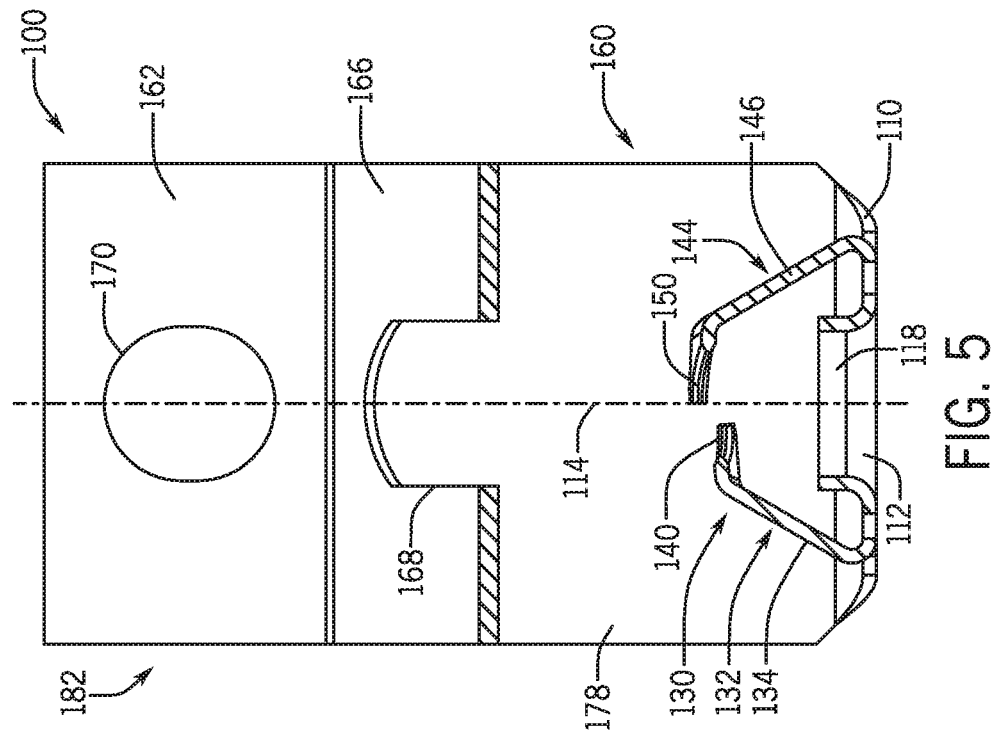
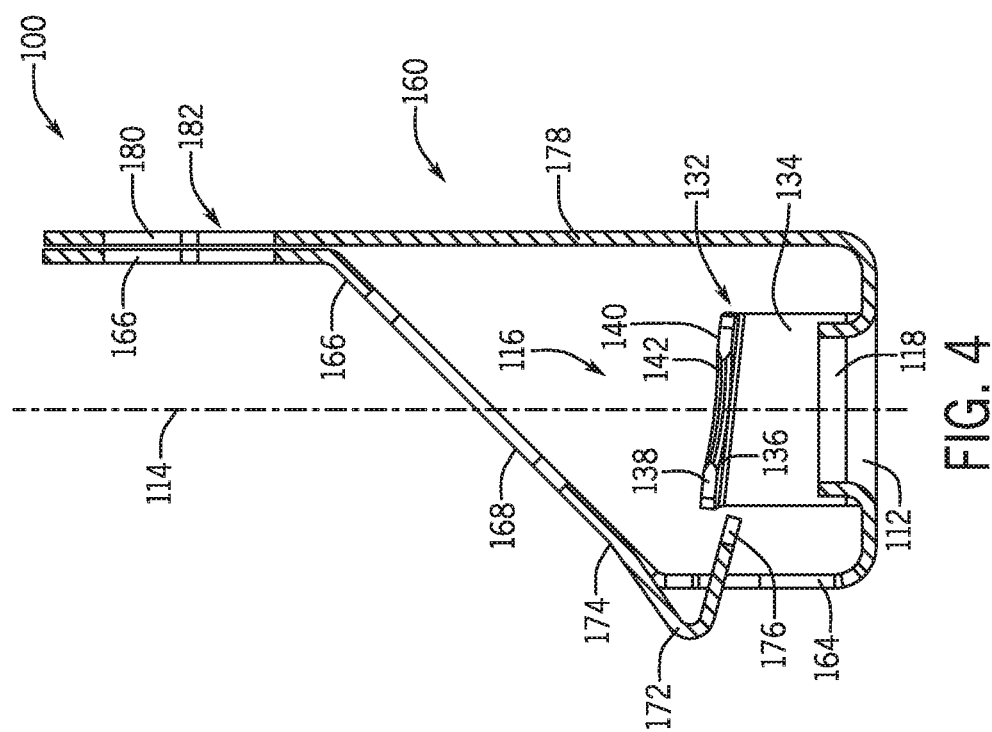

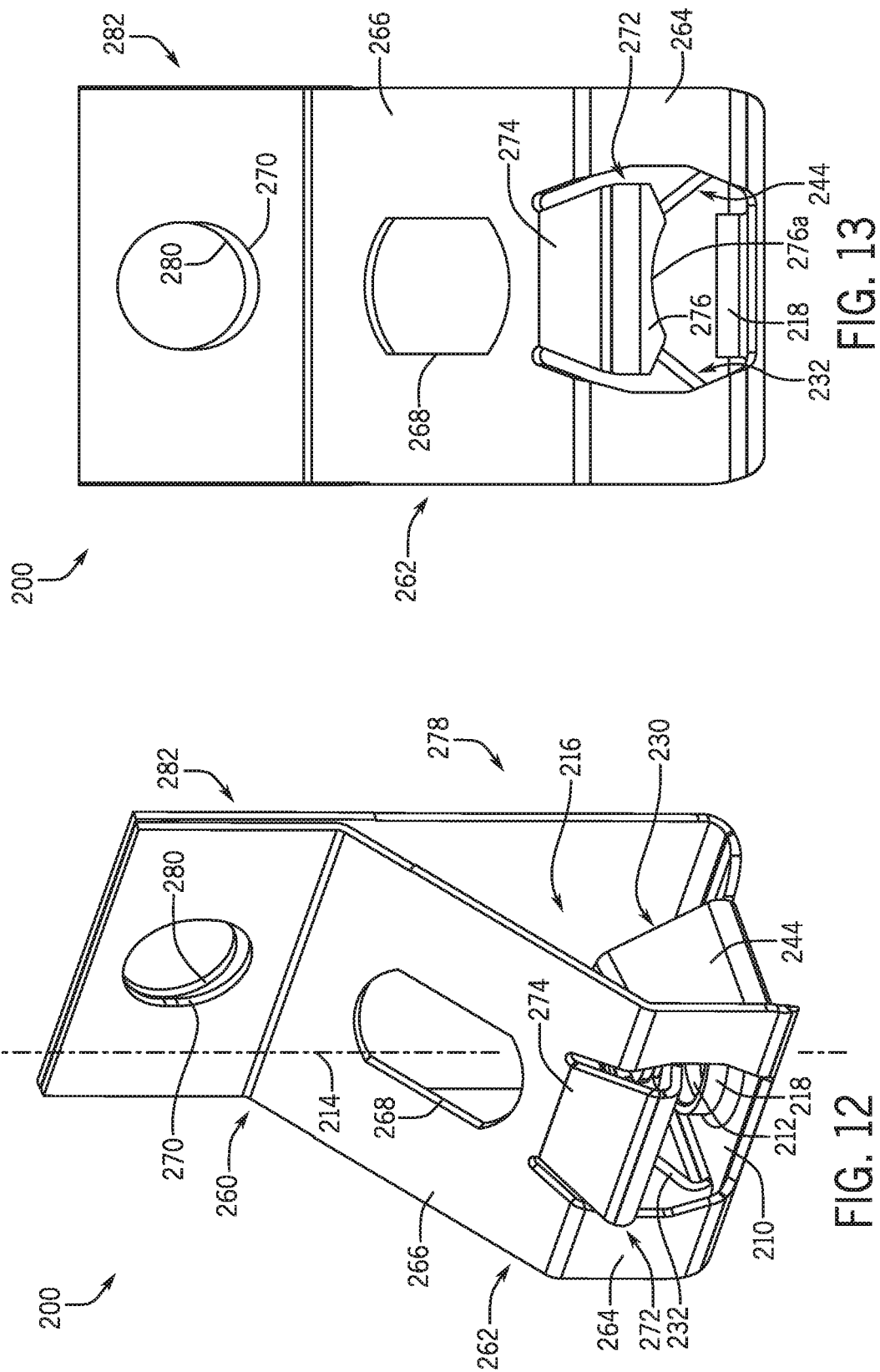

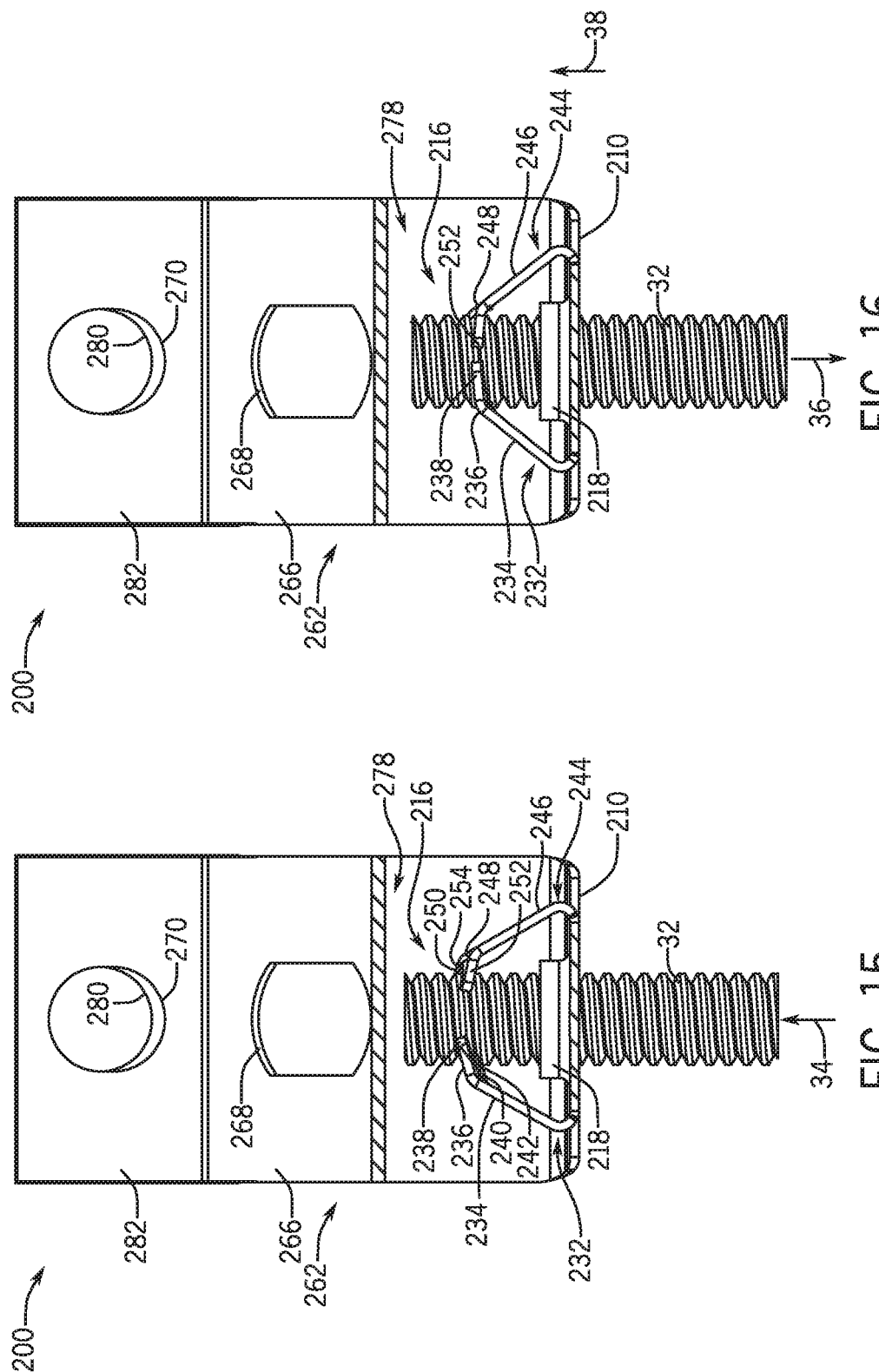

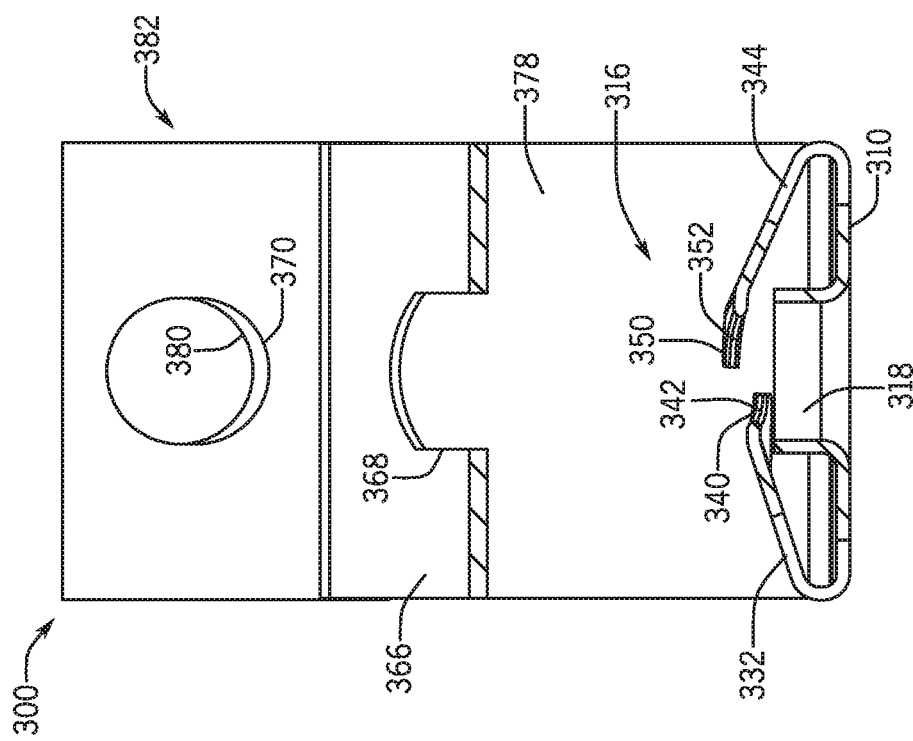
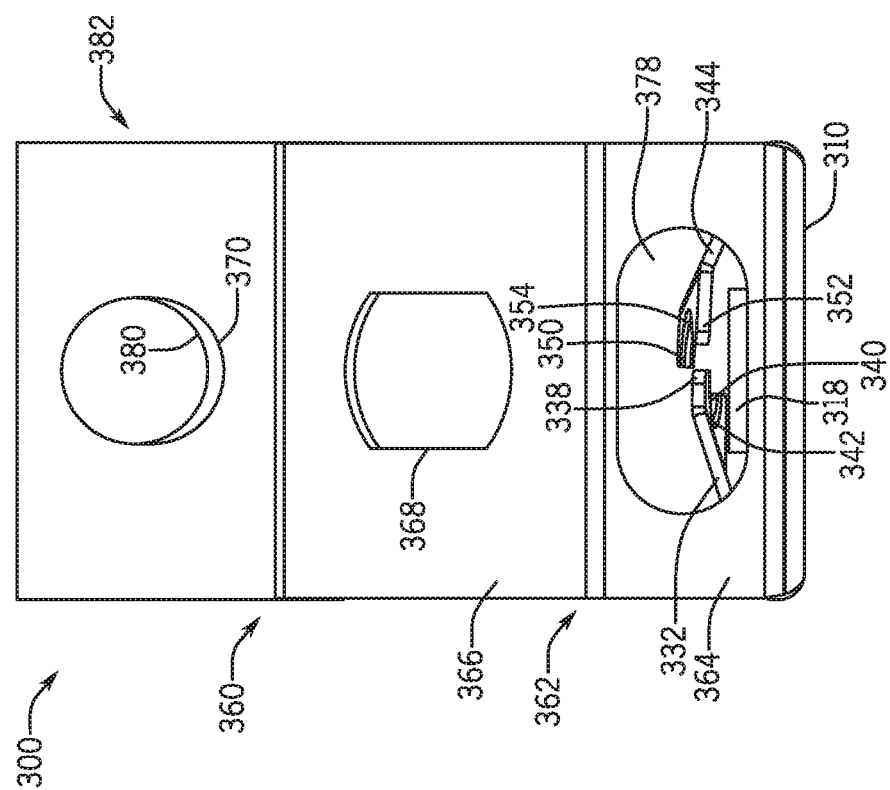

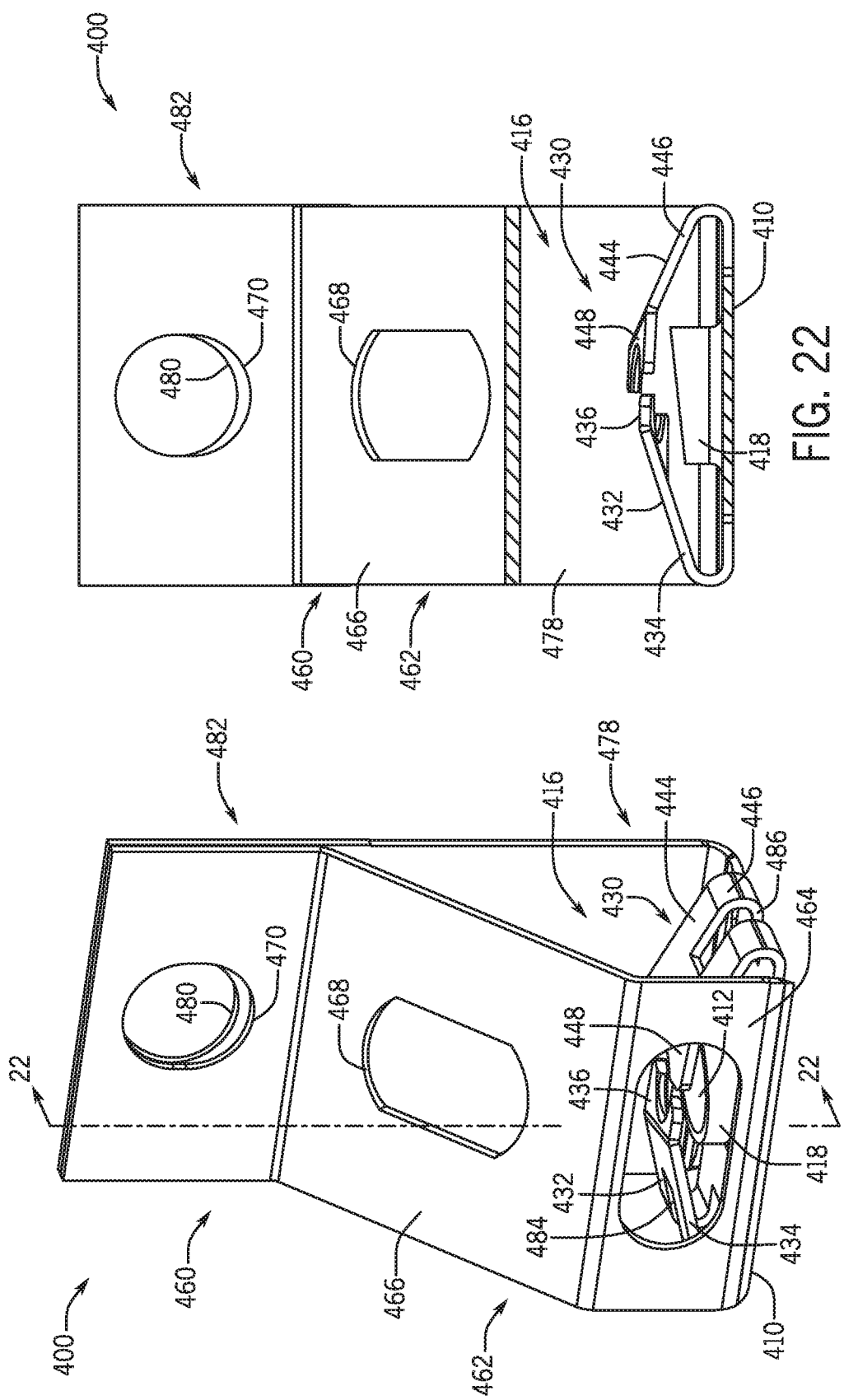

SPRING NUT WITH RELEASE

CROSS-REFERENCE TO RELATED APPLICATIONS

This application claims priority under 35 U.S.C. 119 from U.S. Provisional Application No. 62/841,722, filed May 1, 2019 and is incorporated herein by reference in its entirety.

BACKGROUND

In many applications, it may be useful to quickly attach a nut to a threaded object, in order to use the nut and the threaded object to support other structures. For example, it may be useful to attach a nut to a threaded rod to quickly attach to the threaded rod to a structure and/or to suspend a load. It may also be useful to quickly detach the nut from the threaded rod to remove the threaded rod from the structure and/or to remove the load.

SUMMARY

Some embodiments of the invention provide a spring nut for attaching a threaded object to a structure. The spring nut can include a base, a first arm and a second arm extending from the base, a first tab and a second tab extending from the base, and a wedge element coupled to the first tab. The first and second arm can be configured to receive the threaded object without rotation of the threaded object and to retain the threaded object therebetween. The first and second tab can extend from the base opposite one another and adjacent the first and second arms. The first tab can have a vertical portion that extends substantially perpendicular and axially away from the base to a transverse portion that angles over the first and second arms toward the second tab. The wedge element can extend outward from the transverse portion, beyond the vertical portion, and bend back toward the first and second tabs and the base. The wedge element can be configured to selectively operatively urge the first and second arms apart to release the threaded object from between the first and second arms.

Some embodiments of the invention provide a spring nut for attaching a threaded object to a structure. The spring nut can include a base, one or more arms extending from the base, a tab extending from the base, and a wedge supported relative to the tab and the base. The one or more arms can be configured to receive the threaded object without rotation of the threaded object, to retain the threaded object against axial movement in a first direction. The tab can be configured to be affixed to the structure to induce a force upon the base in the opposite direction of a force induced upon the base by a retained threaded object. The wedge can be configured to selectively operatively engaged with the one or more arms to release the threaded object.

Some embodiments of the invention provide a spring nut for attaching a threaded object to a structure. The spring nut can include a first arm and a second arm extending from a base in a first direction and angled toward each other. The first and second arms can be configured to engage the threaded object. A third arm can extend toward the base from an anchor point that is opposite the first and second arms from the base in the first direction. The third arm can be configured to be moved to release the threaded object from the first and second arms. The first, second, and third arms can be unitarily formed from a single piece of material.

DESCRIPTION OF THE DRAWINGS

FIG. 2 is a front elevation view of the spring nut of FIG. 1;

FIG. 3 is a right side elevation view of the spring nut of FIG. 1;

FIG. 4 is a right side cross-sectional view of the spring nut of FIG. 1 along line 4-4 of FIG. 1;

FIG. 5 is a front elevation cross-sectional view of the spring nut of FIG. 1 along line 5-5 of FIG. 1;

FIG. 12 is a top, front, right isometric view of a spring nut according to another embodiment of the invention;

FIG. 13 is a front elevation view of the spring nut of FIG. 12;

FIGS. 14-17B are views of the spring nut of FIG. 12 with a threaded object being aligned with, received by, loaded within, and removed from the spring nut;

FIG. 19 is a front elevation view of the spring nut of FIG. 18;

FIG. 20 is a cross-sectional view of the spring nut of FIG. 18 along line 20-20 of FIG. 18;

FIG. 21 is a top, front, right isometric view of a spring nut according to another embodiment of the invention;

FIG. 22 is a cross-sectional view of the spring nut of FIG. 21 along line 22-22 of FIG. 21;

DETAILED DESCRIPTION

Figure 1:
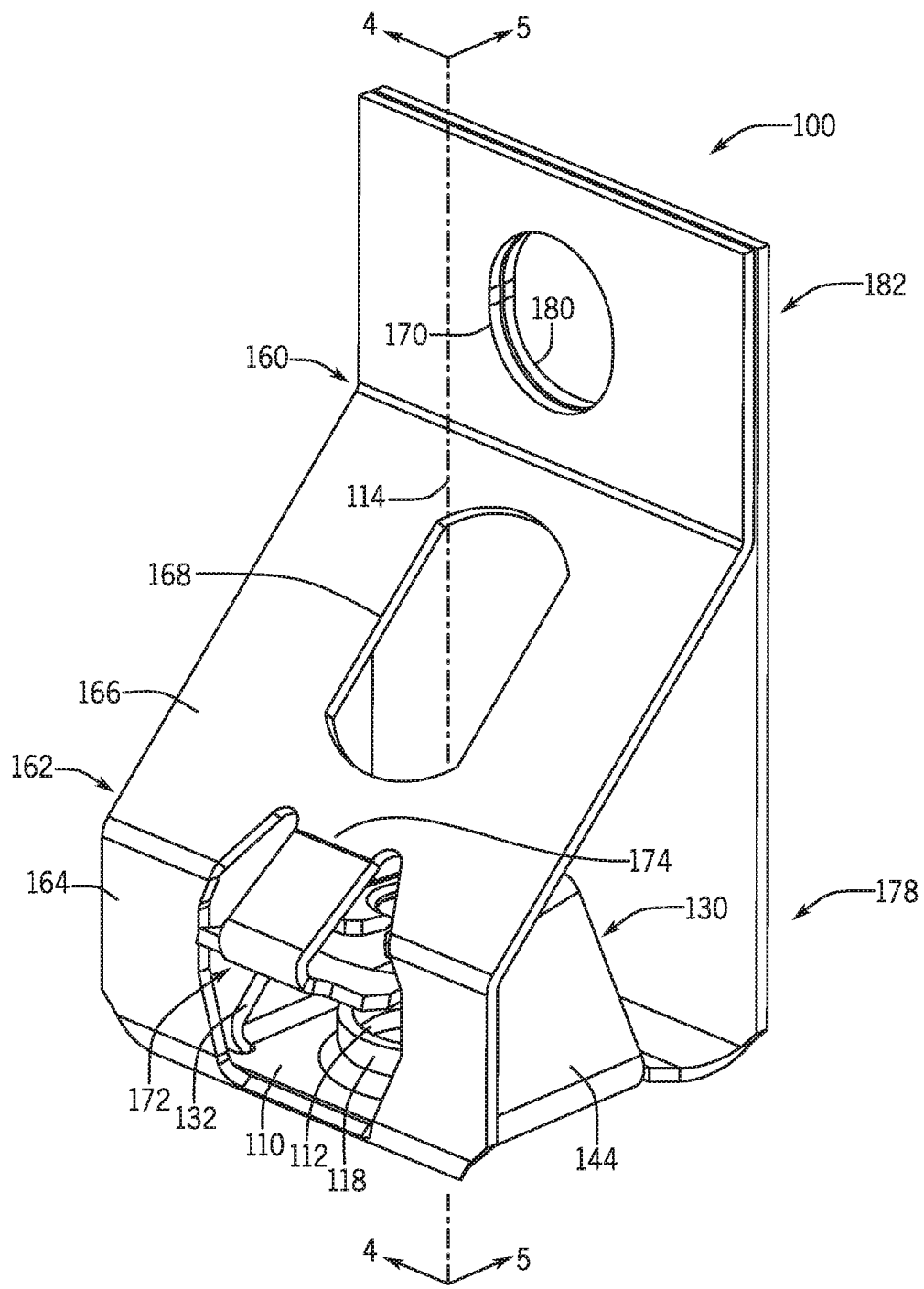
FIG. 1 is a top, front, right isometric view of a spring nut according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise defined or limited, directional terms are used for convenience of reference for discussion of particular figures or examples. For example, references to downward (or other) directions may be used to discuss aspects of a particular example or figure, but do not necessarily require similar orientation or geometry in all installations or configurations.

As used herein, unless otherwise specified or limited, the term "axial" (and the like) in the context of spring nuts generally refers to a direction of insertion of a threaded object, such as the (elongate) axial direction of an elongate threaded rod. Similarly, the term "lateral" (and the like) in the context of spring nuts generally refers to a direction that extends perpendicularly relative to the axial direction. In this regard, lateral directions or movements can include, but are not limited to, radial directions or movements.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

In the discussion below, various examples describe spring nuts for attaching a threaded rod to a structure (e.g., a building support) and thereby suspending a load from the structure. It will be understood that attachment to a threaded rod, as described, is presented as an example only and that embodiments of the disclosed spring nut can be used to attach to other objects, such as threaded fasteners or other threaded objects.

Some embodiments of the invention can provide spring nuts with improved retention strength as compared to conventional designs. For example, in some embodiments of the invention, resilient arms and a structure-engaging portion can extend from a spring-nut base, such as with the structure-engaging portion substantially perpendicular (or otherwise oriented) relative to the base and extending from the same side of the base as the resilient arms. Further, the resilient arms can extend at acute angles laterally inwardly from the spring-nut base to thread-engagement portions that are configured to engage the thread of a threaded object. In some embodiments, the resilient arms can extend laterally outwardly from the spring-nut base first and then extend inwardly at an acute angle to thread-engagement portions. Thus arranged, for example, some embodiments of a spring nut can allow for non-rotational insertion of a threaded object between the resilient arms to be supported, via the structure-engaging portion, relative to a separate support structure.

In some embodiments, the structure-engaging portions, the base, and the acutely angled, laterally inwardly extending resilient arms can cooperatively contribute to a favorable balance of forces upon axial loading of a threaded object held by a spring nut according to the invention. Indeed, in some embodiments, this can result in increasingly firm attachment of the spring nut to the threaded object as the loading on the threaded object increases.

Some embodiments of the invention can also provide a release mechanism to allow quick (intentional) release of a threaded object from a set of resilient arms. For example, a wedge can extend from a support-engagement portion and can be configured to be selectively engaged with relevant resilient arms in a manner that releases a threaded object held therebetween. In some embodiments, a wedge can be formed integrally with a spring nut and can be configured to be readily manually operated, such as by using hand tools (e.g., a vise grip or other pliers).

Generally, a wedge as discussed herein can be configured as any structure or combination of structures that can impose a lateral force on a set of arms relative to a particular movement towards or through the arms. In this regard, for example, a wedge according to different embodiments of the invention can be configured as a triangular, trapezoidal, or otherwise angled wedge, as a rounded wedge, as a single-piece extension of a body, as a multi-piece extension of a body, or in various other ways.

In some embodiments, arms of a spring-nut body (e.g., as described above) can be formed as continuous features along with a spring-nut base, structure-engaging portions, and a wedge for releasing a threaded object from the arms. For example, a set of arms can extend continuously from opposing parts of a spring-nut base (i.e., across from one another), support-engagement portions can extend (e.g., separately) from the spring-nut base, and a wedge can be formed from a portion of one of the support-engagement portions. This may be useful, for example, in order to simplify manufacturing of the relevant spring nut, while also potentially increasing the load carrying capacity of the spring nut for a given material thickness.

In some embodiments, a spring nut can retain a threaded rod under a load of up to approximately 75 lbs. In some embodiments, a spring nut can accept threaded rods of various diameter, including from 0.25 inch to 0.375 inch. In some embodiments, a larger or smaller diameter threaded rod (or other threaded object) can be accepted in a spring nut according to the invention.

FIGS. 1-6 illustrate a spring nut 100 according to one embodiment of the invention. In some embodiments, the spring nut 100 can be attached to a threaded object to support various other devices. For example, the spring nut 100 can be attached to a threaded rod to allow for quick coupling to a structure or load. In some embodiments, for example, the spring nut 100 can be used to suspend a conduit, a pipe, a duct, or another structure from a separate support, via an attached, intervening threaded object. In some embodiments, the spring nut 100 can be used in other settings.

The spring nut 100 generally includes a base 110, a thread-engaging mechanism 130, and a support-engagement portion 160. In the embodiment illustrated, the spring nut 100, including the base 110, the thread-engaging mechanism 130, and the support-engagement portion 160, are unitarily formed from a single piece of material, although other approaches are possible. In some embodiments, the spring nut 100 can be fabricated from a metal material (e.g., mild steel or spring steel).

In the embodiment illustrated, the base 110 has an aperture 112 surrounded by a raised feature configured as an extruded, non-threaded annular flange 118 that extends integrally from the base 110. Generally, the flange 118 can provide radial support for a threaded object extending through the aperture 112, such as a threaded rod. In some embodiments, the flange 118 can be configured to extend axially away from the base 110 by at least one pitch of an expected thread. In some embodiments, no flange, a partial flange (e.g., set of axially-extending tabs), or other types of rod-support features may be provided.

The aperture 112 generally defines a central axis 114, along which a central passage 116 (see, e.g., FIG. 4) extends axially through the spring nut 100 (e.g., generally vertically, from the perspective of FIG. 1). The central passage 116 extends from the base 110 to the structure-engaging portion 160 and is generally open, but also laterally bounded at intervals by structures including the flange 118 and the thread-engaging mechanism 130. This may be useful, for example, to enable a threaded rod to be axially inserted into the spring-nut 100 along the central axis 114, including without rotation of the threaded rod, as also discussed below and shown in FIGS. 8-11.

The thread-engaging mechanism 130 extends from the base 110 and includes a first resilient arm 132 and a second resilient arm 144. In some embodiments, the first and second resilient arms 132, 144 can be flexible enough to allow a threaded rod to pass therethrough in one direction without the threaded rod rotating, yet can be sufficiently resilient to return to firmly engage the threaded rod and to provide sufficient strength to resist movement of the threaded rod, without buckling, when the threaded rod is loaded in an opposite direction.

In some embodiments, the flexibility and elastic resiliency of the first and second resilient arms 132, 144 enables the spring nut 100 to provide a restorative action, or pre-bias, during insertion of a threaded rod. For example, the first and second resilient arms 132, 144 can flex laterally outwardly as a crest of a thread of a threaded rod being inserted through the spring nut 100 passes between free ends of the first and second resilient arms 132, 144. For example, the first and second resilient arms 132, 144 can flex in a direction extending generally perpendicular to the central axis 114. Further, restorative action due to the resiliency of the first and second resilient arms 132, 144 can subsequently return (and generally bias) the first and second resilient arms 132, 144 laterally inwardly (e.g., toward the central axis 114 along respective lateral directions) and into gripping engagement with the threaded rod between the passed crest and a subsequent crest of the thread.

In some embodiments, resilient arms can angle laterally inwardly from a base, relative to a central axis or passage, as may help to ensure appropriate engagement with a threaded object. For example, with the spring nut 100 assembled as shown, the first and second resilient arms 132, 144 angle acutely laterally inwardly and axially upwardly from the base 110. In particular, the first resilient arm 132 includes a first connecting portion 134 and a first thread-engaging portion 136 (see, e.g., FIGS. 6 and 7). The first connecting portion 134 extends upwardly from the base 110 and inward toward the central axis 114 at an angle in the range of greater than 0 degrees to less than 90 degrees from the base 110. The first thread-engaging portion 136 extends substantially laterally inward from the distal end of the first connecting portion 134

Figure 6:
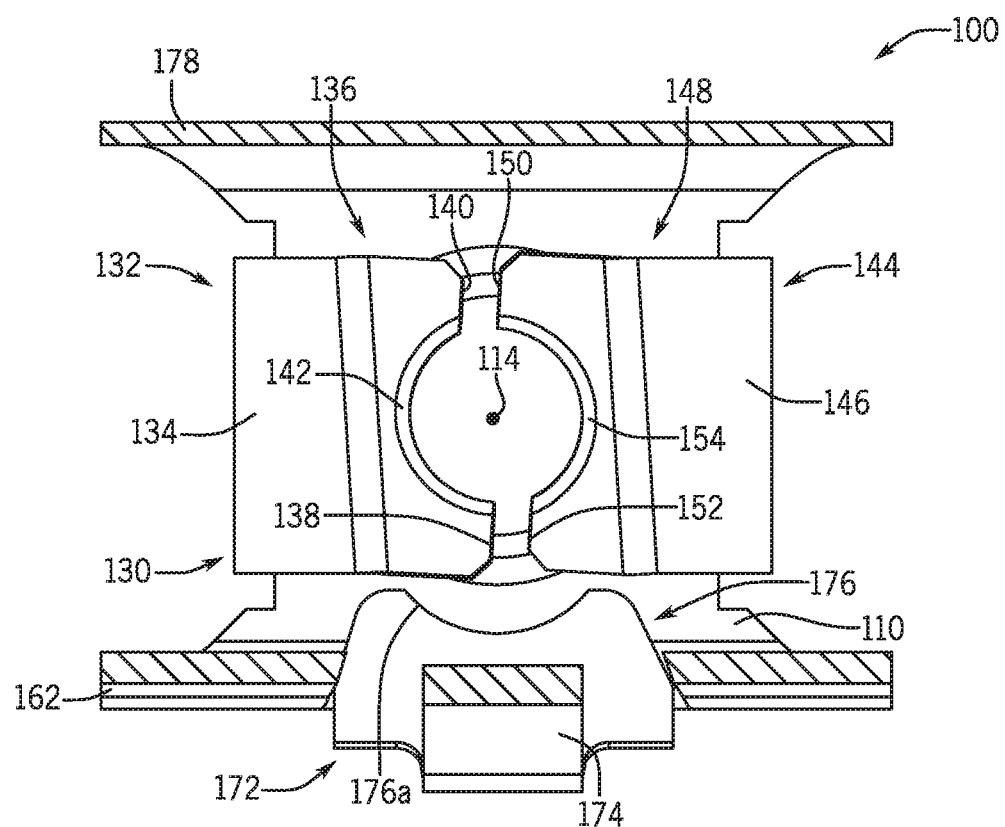
FIG. 6 is a cross-sectional view of the spring nut of FIG. 1 along line 6-6 of FIG. 3.
Figure 7:
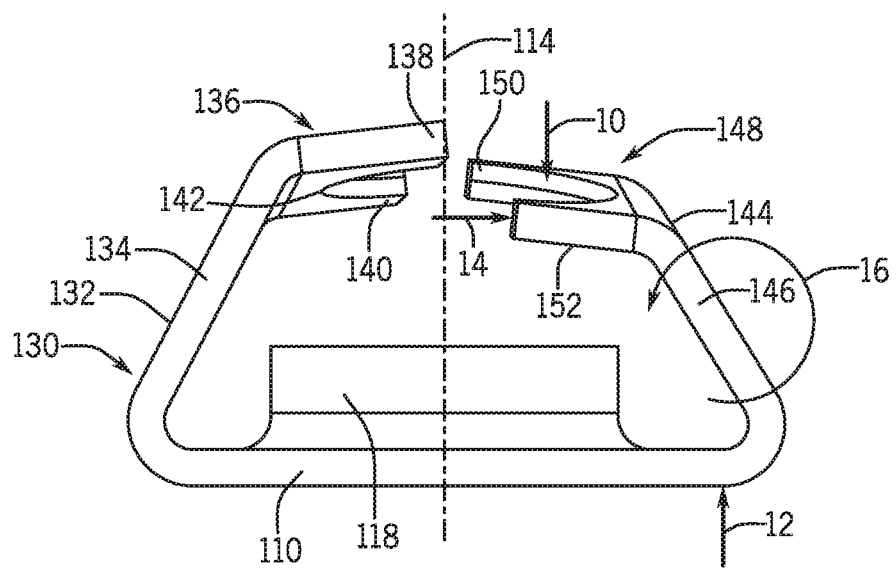
FIG. 7 is a front schematic partial view of the spring nut of FIG. 1.

Similarly, the second resilient arm 144 includes a second connecting portion 146 and a second thread-engaging portion 148 (see, e.g., FIGS. 6 and 7). The second connecting portion 146 extends upwardly from the base 110 and inwardly toward the first resilient arm 132 at an angle in the range of greater than 0 degrees to less than 90 degrees from the base 110. The second thread-engaging portion 148 extends substantially laterally inward from the distal end of the second connecting portion 146.

In the illustrated embodiment, the connecting portions 134, 146 exhibit a generally linear geometry, between an acute bend at the base 110 and an oblique bend at the thread-engaging portions 136, 148. In other embodiments, however, other configurations are possible. For example, some resilient arms may include connecting portions that exhibit compound geometry (e.g., with multiple linear portions having different relative slopes), curved geometry, or other configurations. In some embodiments, connecting portions or other parts of relevant resilient arms can include other features, such as slots or other cutouts, or extruded or otherwise raised (or recessed) portions (e.g., as illustrated in FIGS. 15 and 16 and discussed below).

First and second thread-engaging portions are generally designed to cooperate to engage and secure a threaded rod that has been inserted (e.g., without rotation) through the relevant spring nut. Accordingly, for example, the first and second thread-engaging portions 136, 148 are arranged along a generally helix-like path to conform to a standard thread type on a threaded rod. In other embodiments, however, other configurations are possible. For example, some thread-engaging portions may exhibit non-helical configurations.

In some embodiments, as also discussed below, first and second thread-engaging portions can exhibit a compound geometry, such as may be helpful to ensure ready insertion of a threaded object and appropriate engagement of the threaded object upon loading. For example, as also discussed below, a first portion of each of the first and second thread-engaging portions 136, 148 exhibits a first geometry (e.g., as corresponds to a first projected angle of a thread) and a second portion of each of the first and second thread-engaging portions 136, 148 can exhibit a second different geometry (e.g., as corresponds to a second projected angle of the thread).

In different embodiments, different structure-engaging portions can be provided, to usefully secure the relevant spring nut to an appropriate support structure (e.g., structural beam, building wall, etc.). In this regard, for example, the structure-engaging portion 160 as shown in FIGS. 1-5 includes a first tab 162 extending integrally from the base 110 and a second tab 178 also extending integrally from the base 110 opposite the first tab 162. The first tab 162 has a vertical portion 164 that extends substantially perpendicular and axially away from the base 110 to a transverse portion 166 that angles over the central passage 116 toward the second tab 178. The first tab 162 can have an aperture 168 in the transverse portion 166 through which an inserted threaded rod may pass through. The second tab 178 has a vertical portion 164 that also extends substantially perpendicular and axially way from the base 110. Respective portions of the first and second tabs 162, 178 can meet (e.g., contact each other) and overlap to provide an engagement portion 182. This may be useful, for example, in order to provide a double- (or other) thickness support feature for attachment to another structure. As illustrated in FIG. 1, the spring nut 100 includes axially aligned holes 170, 180 on the first and second tabs 162, 178, respectively, to allow mounting to a structure, for example, with a fastener received therethrough. Thus arranged, for example, the first and second tabs 162, 178 can cooperatively support the base 110 in a manner similar to a simply supported beam.

In other embodiments, other configurations are possible, including configurations in which different structure-engaging features are provided or in which a base is otherwise supported. For example, in some embodiments, only one structure-engaging feature (e.g., only a first or a second tab) can have a mounting feature (e.g., a mounting hole). In such a case, for example, in a spring nut otherwise configured similarly to the spring nut 100, other structure-engaging features (e.g., the other tab) can attach above or below the mounting feature of the first or second tab. In some embodiments, first and second tabs can both extend inwards towards a central axis and engage (e.g., contact) each other to form an engagement feature along or adjacent to the central axis.

As also noted above, it may be useful to provide a release mechanism to help release a threaded object from relevant resilient arms, without the need to rotate the threaded object. For example, in the spring nut 100, the release mechanism is a wedge element 172 integrally extending from the first tab 162. In particular, the wedge element 172 is cantilevered from the first tab 162, opposite the first and second arms 132, 144 from the base 110, to initially extend away from the central axis 114, from a proximal end portion 174 that is anchored to the transverse portion 166 of the first tab 162. In the embodiment shown, the proximal end portion 174 is located laterally between the vertical portion 164 of the first tab 162 and the thread-engaging mechanism 130 and spaced vertically above the thread-engaging mechanism 130, although other configurations are possible.

In different embodiments, different geometries are possible for a wedge element. For example, in the illustrated embodiment, the wedge element 172 extends laterally outwardly from the proximal end portion 174 to beyond the vertical portion 164 of the first tab 162, then bends back laterally inwardly toward the central axis 114 and downwardly toward the base 110. Further, the wedge element 172 extends initially from the proximal end portion 174 along a narrowed neck portion. This may be useful, for example, to allow the wedge element 172 to be appropriately deformed to engage the first and second resilient arms 132, 144 while still ensuring a resilient return to a starting (or other appropriate) orientation once released.

As noted above, a wedge can exhibit a variety of geometries to engage relevant resilient arms of a spring nut. In the illustrated embodiment, for example, a distal end portion 176 of the wedge element 172 (see, e.g., FIG. 6) includes an angled wedge shape that narrows in a direction extending from the neck of the wedge element 172 towards the distal end portion 176. Accordingly, the wedge element 172 is configured to be selectively operatively engaged with the first and second resilient arms 132, 144 to release the threaded rod. For example, when the first and second resilient arms 132, 144 are retaining a threaded rod therebetween, with an inwardly biased engagement, the distal end portion 176 of the wedge element 172 can be forced between the first and second resilient arms 132, 144 to impart an outward force to the first and second resilient arms 132, 144 and thereby release the threaded rod. Further, once the wedge element 172 is released (e.g., from engagement with manually operated pliers), the wedge element 172 can resiliently return to a default position, thereby allowing the resilient arms 132, 144 to again engage a threaded rod.

Also in the illustrated embodiment, because of the location of the proximal end portion 174 of the wedge element 172 relative to the first and second resilient arms 132, 144, and because of the orientation of the wedge element 172 in general, the wedge element 172 also imparts an upward force (from the perspective of FIG. 1) away from the base 110 when the wedge element 172 is engaged with the resilient arms 132, 144. This can be useful, for example, to help promote a more positive engagement of the wedge element 172 with the inwardly angled first and second resilient arms 132, 144. For example, the angled geometry of the connecting portions 134, 146 may tend to urge the wedge element 172 towards the base 110 as the wedge element 172 is urged laterally into engagement with the arms 132, 144. However, the angled mounting of the wedge element 172, and an anchor location opposite the arms 132, 144 from the base 110, can provide an opposing, resilient response in the wedge element 172 that can help to ensure that the wedge element 172 remains appropriately disposed to laterally displace the arms 132, 144, rather than sliding along the connecting portion 134, 146 towards the base 110.

In other embodiments, however, other configurations are possible. For example, in some embodiments, a wedge element according to the invention can extend (e.g., integrally) upward from a base and operatively engage the relevant resilient arms in a similar manner as the wedge element 172.

In some embodiments, other features can also be provided. For example, as shown in FIG. 6 in particular, the distal end portion 176 of the wedge element 172 has a curved profile 176a that is shaped to receive the threaded rod as the wedge element 172 is used to urge the first and second resilient arms 132, 144 apart. The curved profile 176a, or other similar relief on a wedge element, can provide clearance to allow the relevant wedge element (e.g., 172) to be urged into appropriately full engagement with the relevant resilient arms, without being blocked by a threaded object that is being held by the arms. The curved profile 176a, or other similar relief features, can also provide clearance to allow the threaded object to be withdrawn from a spring nut when the relevant wedge element is used to release the resilient arms.

In some instances, it may not be preferable to support the spring nut from a structure. For example, some embodiments can include spring nuts configured as push-on nuts to be used in conjunction with a threaded rod or other threaded object. In some embodiments, many aspects of these forms of spring nuts can be similar to the spring nut 100, as described above. For example, push-on nuts according to the invention can generally include first and second resilient arms that angle laterally inwardly from a base to receive and retain a threaded rod. Similarly, for example, some push-on nuts according to the invention can include wedges (e.g., similar to the wedge element 172) to help release a threaded object from the relevant resilient arms.

In some aspects, a push-on form of spring nut can differ from the spring nut 100. For example, in some embodiments, first and second tabs extending from a base (e.g., similar to the tabs 162, 178) may not be included. Instead, for example, a plurality of corner posts can extend upwardly from corners of the base, to provide additional structural rigidity. In some embodiments, a wedge element (e.g., similar to the wedge element 172 described above) can extend integrally upwardly from a base to selectively operatively engage first and second resilient arms and thereby release the arms from engagement with the threads of the threaded object. In some embodiments, a top plate can be provided to extend substantially parallel with a base on an opposite side of first and second resilient arms and, for example, attached to a plurality of corner posts. The top plate can, for example, have a hole therein that is axially aligned with an aperture in the base when the top plate is positioned over the base and that is sized and configured to allow a threaded object to pass therethrough. Thus, for example, in some embodiments, a spring nut can be pushed on and engaged with a threaded rod and can be rotated about the threaded rod to tighten or loosen the spring nut. Additionally, a wedge element can extend integrally downwardly from the top plate to selectively operatively engage first and second resilient arms to release the arms from engagement with the threads of a retained threaded object.

In some embodiments, thread-engaging portions of a spring nut can be contoured to provide improved engagement with a thread of a threaded object, as compared to conventional designs. For example, in the embodiment illustrated in FIGS. 4-7, the first thread-engaging end 136 angles generally downwardly toward the second tab 178 (see, e.g., FIG. 4 in particular) with a first leading edge 138 being arranged axially higher than a first trailing edge 140 (i.e., axially farther from the base 110 than the first trailing edge 140). Similarly, the second thread-engaging end 148 angles generally downwardly away from the second tab 178 (see, e.g., FIGS. 6 and 7 in particular), with a second leading edge 150 being arranged axially higher than a second trailing edge 152. Additionally, the first leading edge 138 is arranged axially higher than the second leading edge 150 and the first trailing edge 140 is arranged axially higher than the second trailing edge 152. In this way, for example, the first and second thread-engaging ends 136, 148 collectively form a general helix-like profile that is configured to engage a thread on a threaded rod.

In some embodiments, other features can be provided. As illustrated in FIG. 6 in particular, for example, the first and second leading edges 138, 150 extend laterally toward the central axis 114 farther than do the first and second trailing edges 140, 152. This arrangement can be helpful, for example, to provide a leading edge lead-in for engagement of a thread of a threaded rod. This leading edge lead-in can help to ensure that the leading edges 138, 150 are appropriately drawn into engagement with a thread on a threaded rod (or other object) when the threaded rod is initially loaded.

As another example, as illustrated in FIGS. 4 through 7, the first and second thread-engaging ends 136, 148 include first and second curved edges 142, 154 arranged between the leading edges 138, 150 and the trailing edges 140, 152, respectively. Generally, curved edges according to the invention can be configured for secure engagement with any variety of threads on a threaded rod. For example, the curved edges 142, 154 generally define a radius of curvature that is designed to match a radius of curvature of a root of a thread on a standard threaded rod. Similarly, the curved edges 142, 154 are tapered (e.g., coined) to narrow from a perspective moving radially inwardly towards the central axis 114, in order to better engage a thread. Accordingly, for example, the curved edges 142, 154 can define a minimum thickness at distal ends thereof, as may be useful for penetration of the curved edges 142, 154 towards the root of a thread, between adjacent thread crests.

In some embodiments, implementing a tapered configuration on the curved edges 142, 154 can allow a relatively large material thickness to be used for the first and second resilient arms 132, 144, which can provide additional general strength against buckling or other structural failure. In some embodiments, the tapered configuration of the curved edges 142, 154 can also provide structural advantages for engaging with a thread of a threaded rod. For example, as also noted above, the thinner end of the curved edges 142, 154 may generally enable the curved edges 142, 154 to engage a thread of a threaded rod closer to the root of the thread. Because the greatest amount of material on a thread to support a load is generally close to the root of a thread, tapering the curved edges 142, 154 to facilitate engagement of the curved edges 142, 154 at or near the root can allow the curved edges 142, 154 to engage the thread at an area of relatively thick material, thereby generally increasing a relevant thread shear area and stripping load.

In some embodiments, thread-engaging portions of a spring nut can exhibit other useful configurations, including compound angular profiles. In the embodiment illustrated, for example, the first thread-engaging end 136 defines a compound angled profile (e.g., as projected with respect to a central plane oriented perpendicularly to the central axis 114). In particular, the first thread-engaging end 136 includes a transition point disposed between the first leading edge 138 and the first trailing edge 140, with different angular profiles on opposite sides of the transition point. In some embodiments, multiple thread-engaging ends on multiple resilient arms can exhibit compound angled profiles.

In some embodiments, one or more of the angular profiles on either side of the transition point can exhibit angles chosen to compromise between a helix angle of a thread on a threaded rod and a projected angle of a more interior point on the thread. In some embodiments, different angles on either side of the transition point can be selected from a projected angle corresponding to thread angles at the root diameter of a thread on a threaded rod, at a pitch diameter of the thread, at a major diameter of the thread, or otherwise. In the embodiment illustrated, for example, the side of the transition point closer to the first leading edge 138 approximates a projected angle relative to the pitch diameter of a relevant thread, and the side of the transition point closer to the first trailing edge 140 approximates a projected angle relative to the root of the thread. This may be a useful configuration, for example, in order to promote maximum engagement between a thread of a threaded rod and the first thread-engaging end 136. In other embodiments, other configurations are possible. For example, the side of the transition point closer to the first trailing edge 140 can exhibit an angle that is between those noted immediately above.

In some embodiments, different thread-engaging portions of a particular spring nut can be configured differently. For example, as illustrated in FIG. 7 in particular, the first leading edge 138 of the first thread-engaging end 136 extends axially farther away from the base 110 than does the second leading edge 150 of the second thread-engaging end 148. In some arrangements, this configuration can dispose the first leading edge 138 to engage a thread of a threaded rod on an uphill side of the thread, which can tend to draw the first leading edge 138, and the first curved edge 142 generally, into tighter engagement with the thread upon initial loading of the threaded rod.

When receiving a threaded rod, the general design of the spring nut 100 and, in particular, the angled configuration of the first and second thread-engaging ends 136, 148 can help to compensate for differences in a projected thread angle between a thread lean-in and a projected thread angle at other locations along a thread (e.g., at a minor diameter, at a major diameter, and at a pitch diameter). In this way, for example, when a threaded rod is unloaded, the first and second leading edges 136, 148 can be oriented somewhat askew from a thread on the threaded rod, which can allow a threaded rod to easily push through the first and second thread-engaging ends 136, 148 (e.g., in an upward axial direction, from the illustrated perspective in FIGS. 8 and 9). Once a threaded rod is inserted and loaded, however, the first and second leading edges 136, 148 can be deformed somewhat from their resting orientation, to be drawn into closer engagement with a thread on the threaded rod (see, e.g., FIGS. 10 and 11). In this regard, for example, selecting a leading-edge angle that is between the projected angles of a root diameter and a major diameter, but slightly closer to the projected angle at the root diameter, can help to bring the first and second thread-engaging ends 136, 148 into optimal engagement with the relevant thread.

In some embodiments, other aspects of the configuration of the arms of a spring nut according to an invention can also provide improved retention with a threaded object. In some embodiments, for example, the extension of a connecting portion acutely inwardly from a base can contribute to a beneficial balance of forces upon loading of a threaded object. In the embodiment illustrated, for example, once a threaded rod that is engaged with the spring nut 100 is loaded, the design of the spring nut 100 can generally result in a balance of forces and moments that tends to bring the first and second thread-engaging ends 136, 148 into tighter engagement with a thread in correlation with the load applied to a threaded rod. For example, as illustrated in FIG. 7, a load applied to a threaded rod in a downward direction (from the perspective of FIG. 7) results in a generally vertical force 10 applied by the threaded rod to the second thread-engaging end 148. This force is generally counterbalanced, so that the rod is generally supported against the load, by a generally vertical reaction force 12 on the base 110. In some embodiments, for example, the reaction force 10 can result from the interaction between the base 110 and the structure-engaging portion 160 (see FIG. 1), as supported by the tabs 162, 178.

Notably, because the reaction force 12 is applied to the base 110 at a location that is laterally outside of the second thread-engaging end 148 and, thereby, is laterally outwardly offset from the vertical force 10, a first moment is induced on the second resilient arm 144. A second moment in an opposite direction is also induced on the second resilient arm 144 from a horizontal component 14 of a force generated from the angled interaction of a thread of the threaded rod with the second thread-engaging end 148. With appropriate configuration with regard to the lateral positioning of the contact between the second resilient arm 144 and the base 110, and the corresponding acute angle of the arm 144, the first moment can generally be greater in magnitude than the second moment. Accordingly, a net moment 16 can result, which can generally urge the second thread-engaging end 148 into tighter engagement with a thread as a threaded rod is increasingly loaded. In this way, for example, the more a threaded rod is loaded, the more strongly the second resilient arm 144 is urged into engagement with the rod and the more strongly the spring nut 100 retains the rod.

Similar considerations as those discussed above for the second resilient arm 144 also apply to the first resilient arm 132. For simplicity of presentation, such discussion is not repeated and relevant forces and moments are not illustrated for the first resilient arm 132 in FIG. 7.

As illustrated in FIGS. 8 through 11, the spring nut 100 is configured to be attached to a threaded object, here shown as a threaded rod 30, without requiring rotation of the threaded rod 30, in order to support an applied load. For example, the first thread-engaging end 136 is configured to engage one side of a threaded rod, with a second thread-engaging end 144 being configured to engage an opposite side of the threaded rod. To better illustrate the interactions between the spring nut 100 and the threaded rod 30, the structure engagement portion 160 is not shown in FIGS. 8 through 11.

Figure 8:
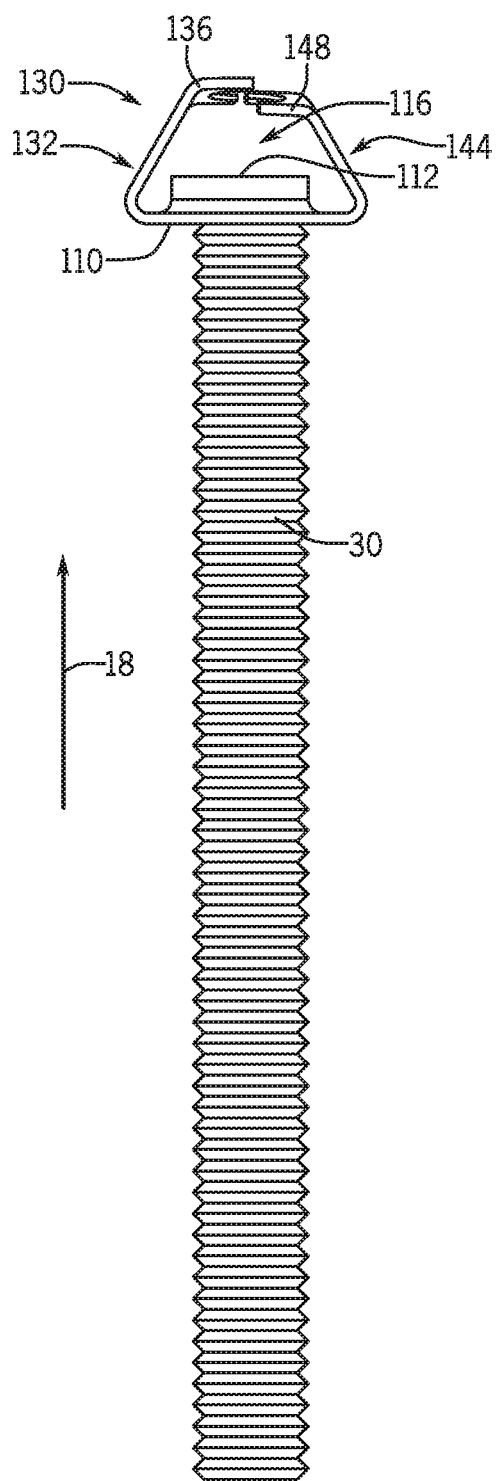
FIG. 8 is a front schematic partial view of the spring nut of FIG. 1 in an initial position when receiving a threaded rod.

As illustrated in FIG. 8, to attach the spring nut 100 to the threaded rod 30, the spring nut 100 can be initially pushed onto the threaded rod 30 (or, inherently, vice versa) so that the threaded rod 30 is inserted through the aperture 112 of the base 110 and into the central passage 116 of the spring nut 100 (see FIG. 1). This generally positions the threaded rod 30 along the central axis 114 and aligns the threaded rod 30 to engage the thread-engaging mechanism 130.

Figure 9:
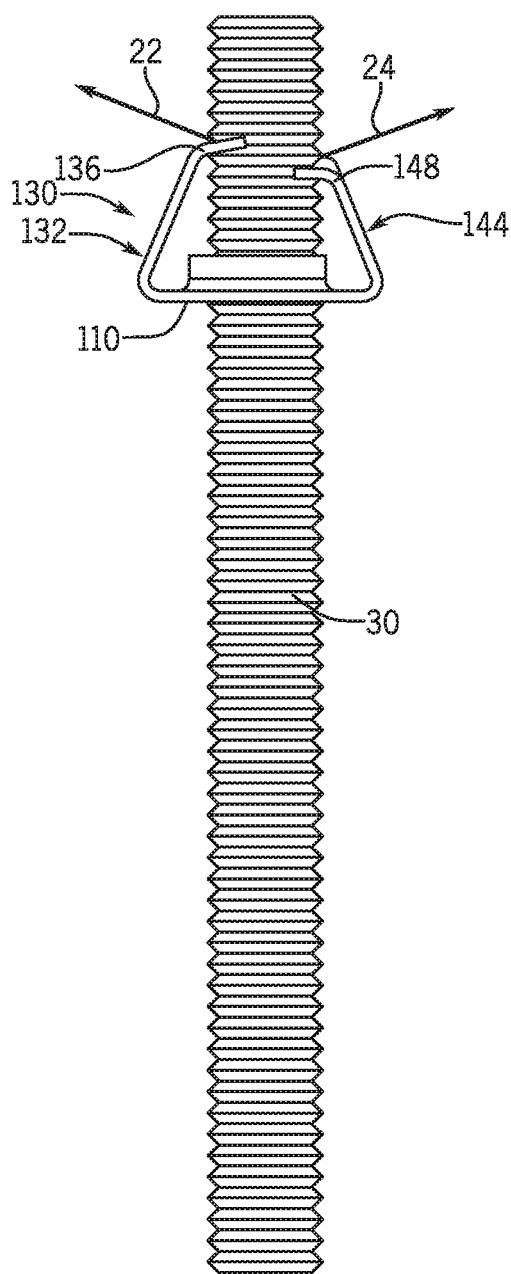
FIG. 9 is a front schematic partial view of the spring nut of FIG. 1 moving over a thread when receiving a threaded rod.
Figure 10:
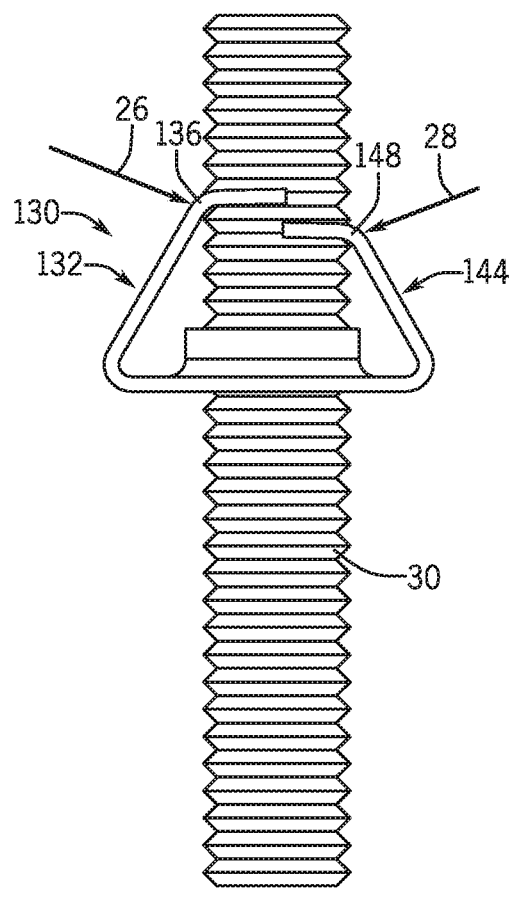
FIG. 10 is a front schematic partial view of the spring nut of FIG. 1 snapped into a thread when engaging a threaded rod.

As illustrated in FIGS. 9 and 10, once the spring nut 100 has been pushed onto the threaded rod 30 (or vice versa) far enough to engage the threaded rod 30 with the first and second thread-engaging ends 136, 148 of the first and second resilient arms 132, 144, the first and second resilient arms 132, 144 flex laterally outwardly to admit the threaded rod 30 therebetween in a first direction 18 (i.e., upward in FIGS. 8 through 11). Further, the first and second resilient arms 132, 144 are configured to resiliently spring laterally inward as each successive crest of the thread of the threaded rod 30 passes the thread-engaging ends 136, 148, in order to automatically engage the threaded rod 30 between the passed crest and a subsequent crest, and thereby resist withdrawal of the threaded rod 30 in a second direction 20 (i.e., downward in FIGS. 8 through 11, see FIG. 11). As illustrated in FIG. 9 in particular, when the thread-engaging ends 136, 148 are passing over a crest of the thread of the threaded rod 30, the first and second resilient arms 132, 144 can be flexed laterally outward (as indicated by arrows 22 and 24). As illustrated in FIG. 10 in particular, as a subsequent root of the thread is moved into alignment with the first and second thread-engaging ends 136, 148, the restorative action of the first and second resilient arms 132, 144 moves the thread-engaging ends 136, 148 laterally inward (as indicated by arrows 26 and 28) into closer engagement with the thread generally (e.g., at or near the root).

Figure 11:
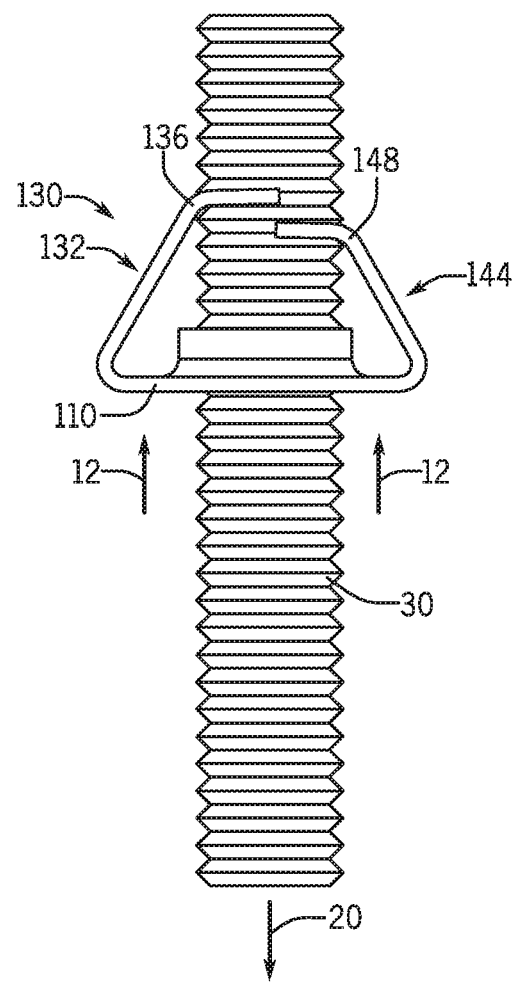
FIG. 11 is a front schematic partial view of the spring nut of FIG. 1 with the spring nut insert attached to a threaded rod and a load applied to the threaded rod.

In some embodiments, as illustrated in FIG. 11, a load may be applied to the threaded rod 30 in the second direction 20, and the load can be transferred to the spring nut 100 at the location where the first and second thread-engaging ends 136, 148 engage the thread of the threaded rod 30. The load can then be transferred from the thread-engaging ends 136, 148 along the first and second resilient arms 132, 144 to the base 110 (see also the discussion above with respect to FIG. 7). The load applied to the threaded rod 30 can accordingly be counterbalanced by reaction force 12 at the engagement between the base 110 and the structure-engaging portion 160. Thus, the load applied to the threaded rod 30 at the thread-engaging ends 136, 148 derives at least in part from the reaction force 12 imparted by the structure-engaging portion 160 to the base 110 when the spring nut 100 is secured to a structure.

As also discussed above, due to the first and second resilient arms 132, 144 extending at acute angles laterally inwardly from the base 110 at a location that is laterally outward from the engagement of the thread-engaging ends 136, 148 with the thread of the threaded rod 30, loading of the threaded rod 30 can generate a reaction moment that generally urges the first and second resilient arms 132, 144 and, in particular, the thread-engaging portions 136, 148, into tighter engagement with the thread of the threaded rod 30. This can generally contribute to the thread-engaging portions 136, 148 being firmly retained in engagement with the thread of the threaded rod 30 and can help to resist, for example, laterally outward forces generated from the angled interaction with the thread on the threaded rod 30. Indeed, with appropriate design (e.g., as illustrated for the spring nut 100), increases in loading on the threaded rod 30 can tend to increase the gripping force of the engagement of the spring nut 100 with the threaded rod 30.

In some embodiments, spring nuts according to the invention can be used with other structure-engaging portions, such as a clip base. A spring nut with a clip base can be configured similarly to the spring nut 100, including a base with a hole, a thread-engaging mechanism coupled to the base and a central passage around a central axis configured to receive and secure a threaded rod. In contrast to the spring nut 100, however, a clip can extend from the base laterally across the central passage to define a gap between the clip and the base. In some arrangements, a structure such as a conduit clamp can be inserted into the gap, to be engaged by the tabs, so that the clip secures the spring nut to the structure. A threaded object, such as a threaded rod, can then be inserted into the spring nut, via an aperture in the clip and a corresponding aperture in the structure within the gap, in order to secure the threaded object to the spring nut and to the relevant structure. In some embodiments, other features can also be provided, such as pointed engagement tabs that extend into the gap between the base and the clip (e.g., towards the base) to help engage another object received therein.

FIGS. 12 and 13 illustrate a spring nut 200 according to an embodiment of the invention. In many aspects, the spring nut 200 is similar to the spring nut 100 described above and similar numbering in the 200 series is used for the spring nut 200. For example, the spring nut 200 has a base 210, a thread-engaging mechanism 230 with a first resilient arm 232 and a second resilient arm 244, a structure-engaging portion 260 with a first tab 262 and a second tab 278, and a wedge element 272 extending from the first tab 262. The base 210 has an aperture 212 with a central axis 214 and a central passage 216 and an annular flange 218 that extends around the periphery of the aperture 212.

The first and second resilient arms 232, 244 share similar geometries and features as the first and second resilient arms 132, 144 of the spring nut 100 discussed above, with additional reference to FIG. 15. For example, the first and second resilient arms 232, 244 extend from the base 210 in a similar manner as the first and second resilient arms 132, 144, the first resilient arm 232 includes a first connecting portion 234 and a first thread-engaging end 236 with a first leading edge 238, a first trailing edge 240, and a first curved edge 242, and the second resilient arm 244 includes a second connecting portion 246 and a second thread-engaging portion 248 with a second leading edge 250, a second trailing edge 252, and a second curved edge 254. Further, the first tab 262 has a vertical portion 264 and a transverse portion 266 with an aperture 268; and the first and second tabs 262, 278 overlap to provide an engagement portion 282 with aligned holes 270, 280. Further, the wedge element 272 has a proximal end portion 274 and a distal end portion 276 with a curved profile 276a.

In some aspects, however, the spring nut 200 differs from the spring nut 100. For example, the proximal end portion 274 is sized to provide additional strength as it is wider at a base 274a and narrows as it extends toward the distal end portion 276.

In some implementations, devices or systems disclosed herein can be utilized or installed using methods embodying aspects of the invention. Correspondingly, description herein of particular features or capabilities of a device or system is generally intended to inherently include disclosure of a method of using such features for intended purposes, of implementing such capabilities, or installing disclosed components to support these purposes or capabilities. Similarly, express discussion of any method of using a particular device or system, unless otherwise indicated or limited, is intended to inherently include disclosure, as embodiments of the invention, of the utilized features and implemented capabilities of such device or system.

Figure 14:
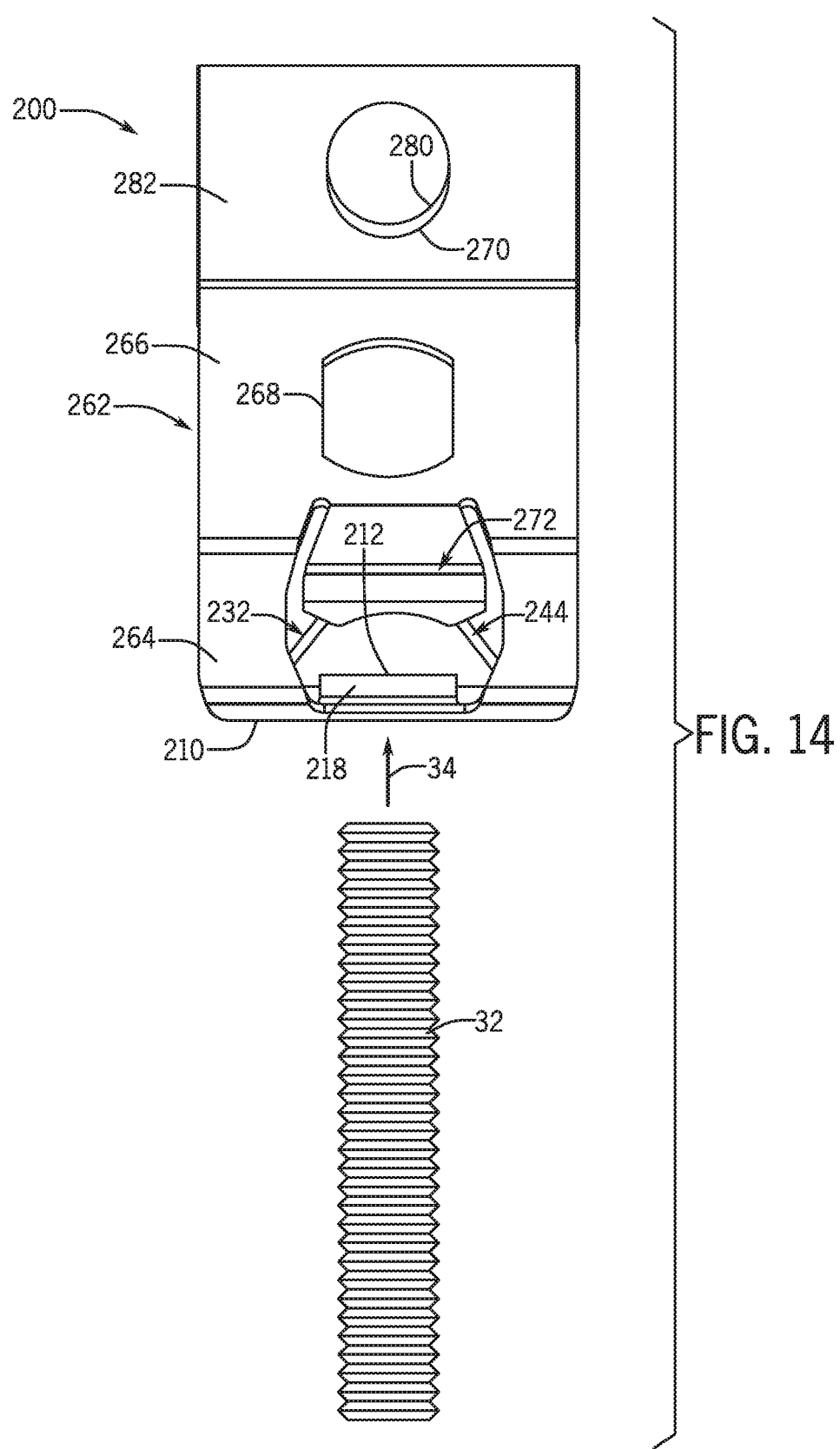

For example, FIGS. 14-17B show the spring nut 200 with a threaded rod 32 being aligned with, received by, loaded within, and removed from the spring nut 200. In many aspects, the interaction between the spring nut 200 and the threaded rod 30 is similar to the interaction of the spring nut 100 and the threaded rod 32 described above. For example, as shown in FIGS. 14 and 15, the spring nut 200 can be initially pushed, without rotation, onto the threaded rod 30 (or, inherently, vice versa) so that the threaded 32 is inserted through the aperture 212 of the base 210 and into the central passage 216 of the spring nut 200 in a first direction 34 to engage with the thread-engaging mechanism 230. As the threaded rod 30 is inserted in this manner, the first and second thread-engaging ends 236, 248 of the first and second resilient arms 232, 244 flex laterally outwardly to admit the threaded rod 30 therebetween. Further, the first and second resilient arms 232, 244 are configured to resiliently spring laterally inward as each successive crest of the thread of the threaded rod 32 passes the thread-engaging ends 236, 248, in order to automatically engage the threaded rod 32 between the passed crest and a subsequent crest, and thereby resist withdrawal of the threaded rod 32 in a second direction 36.

In FIG. 16, the first and second resilient arms 232, 244 are shown having resiliently sprung laterally inward between thread crests of the threaded rod 32 to retain the threaded rod 32 therebetween. A load is shown being applied to the threaded rod 32 in the second direction 36. The load can be transferred to the spring nut 200 at the location where the first and second thread-engaging ends 236, 248 engage the thread of the threaded rod 32. The load can then be transferred from the thread-engaging ends 236, 248 along the first and second resilient arms 232, 244 to the base 210. The load applied to the threaded rod 32 can accordingly be counterbalanced by a reaction force 38 at the engagement between the base 210 and the structure-engaging portion 160. Thus, the load applied to the threaded rod 32 at the thread-engaging ends 236, 248 derives at least in part from the reaction force 38 imparted by the structure-engaging portion 260 to the base 210 when the spring nut 200 is secured to a structure. Also as discussed above with respect to the spring nut 100, due to the first and second resilient arms 232, 244 extending at acute angles laterally inwardly from the base 210 at a location that is laterally outward from the engagement of the thread-engaging ends 236, 248 with the thread of the threaded rod 32, loading of the threaded rod 32 can generate a reaction moment that generally urges the first and second resilient arms 232, 244 and, in particular, the thread-engaging portions 236, 248, into tighter engagement with the thread of the threaded rod 32. As generally noted above, however, some embodiments may include differently angled resilient arms (e.g., in combination with wedged release mechanisms or otherwise).

Figure 17A:
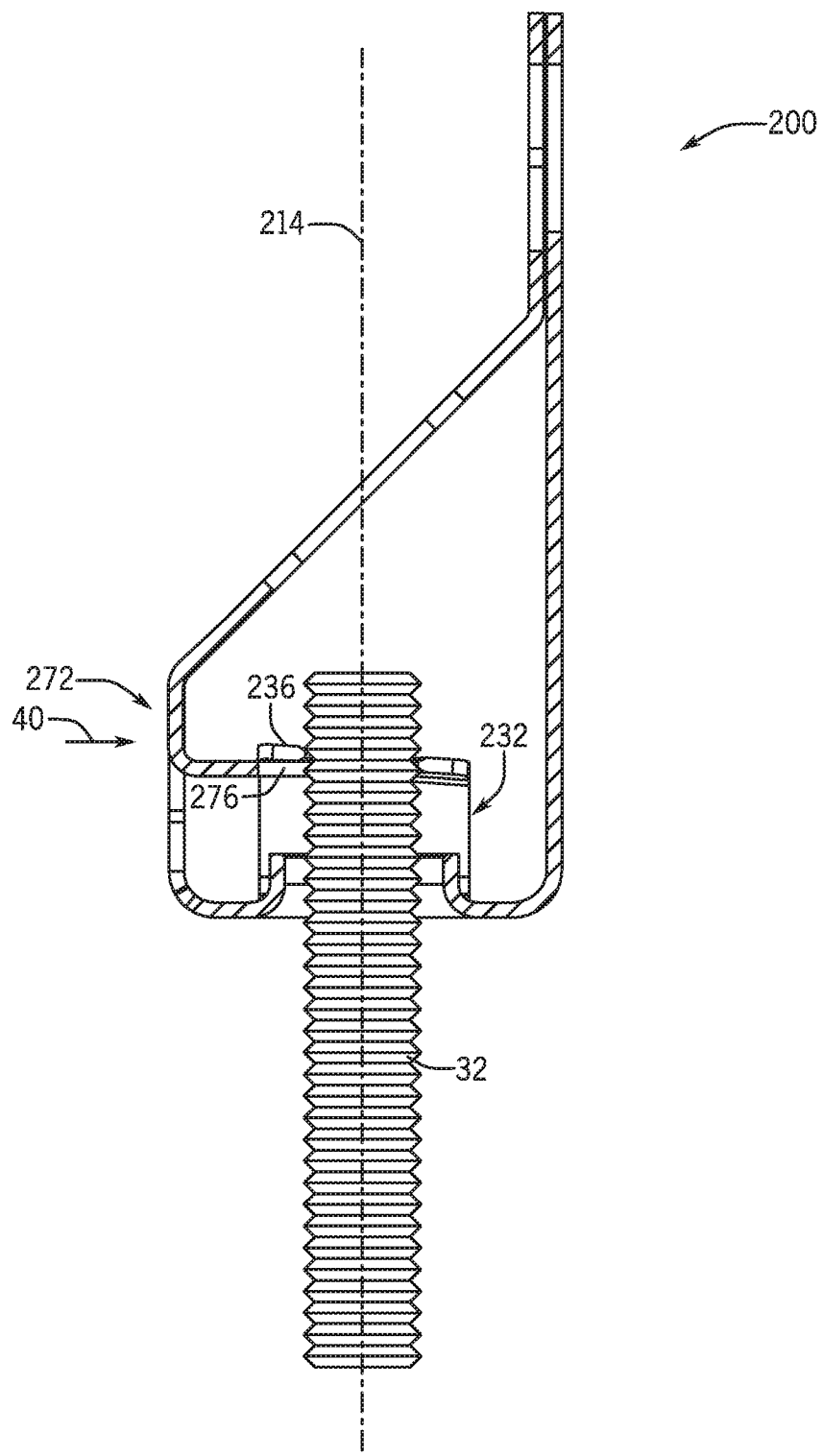
Figure 17B:
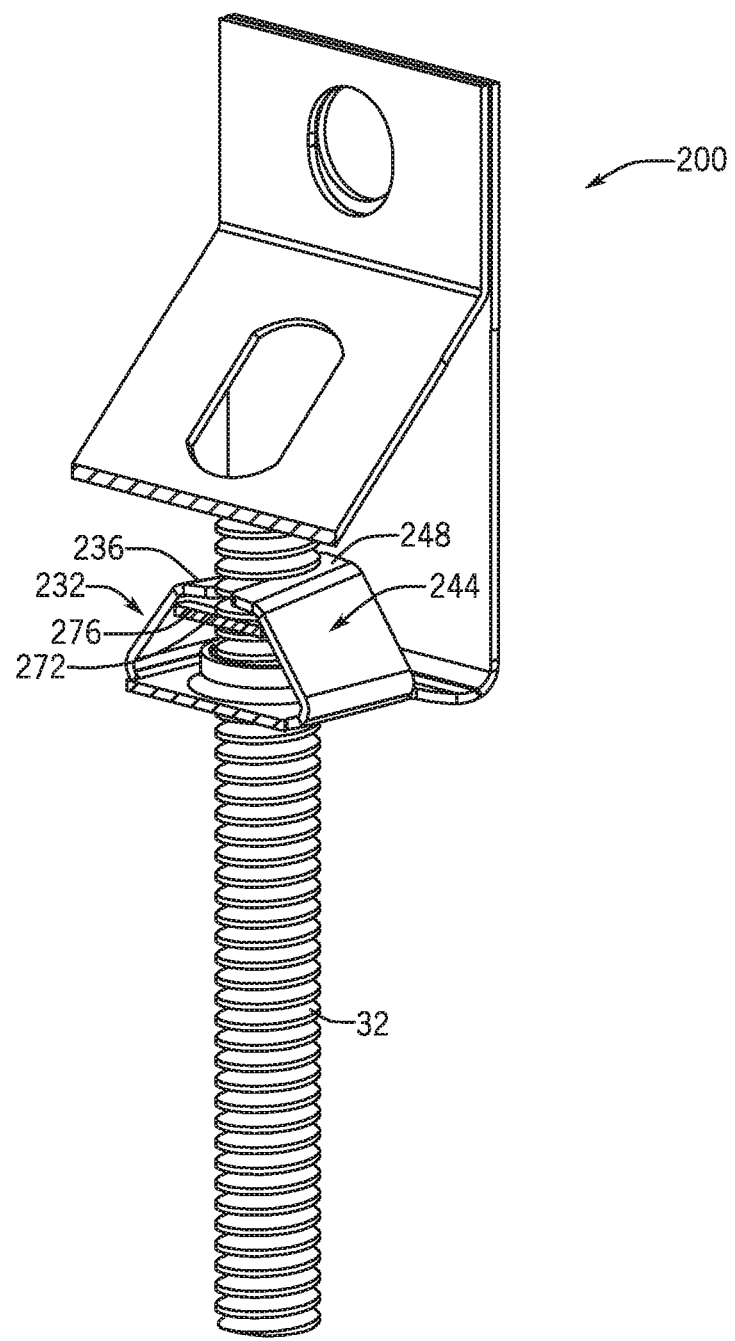

FIGS. 17A and 17B further illustrate the releasing of the threaded rod 32 from the spring nut 200. A force is applied to the wedge element 272 in a third direction 40, at least a substantial component of which is substantially perpendicular to the central axis 214 (e.g., perpendicular to within 1-5°). Thus, the distal end portion 276 of the wedge element 272 is forced between the first and second resilient arms 232, 244 to impart an outward releasing force to the first and second resilient arms 232, 244 to remove the thread-engaging portions 236, 248 from contact with the threaded rod 32, thereby releasing the threaded rod 32. The releasing force can be imparted, in some cases, by engagement with a manually operated pliers arranged in contact with the wedge element 272 and the second tab 278 or in a variety of other ways. It is contemplated that the wedge element 272 can resiliently return to a default position, thereby allowing the resilient arms 232, 244 to again engage a threaded rod.

Figure 18:
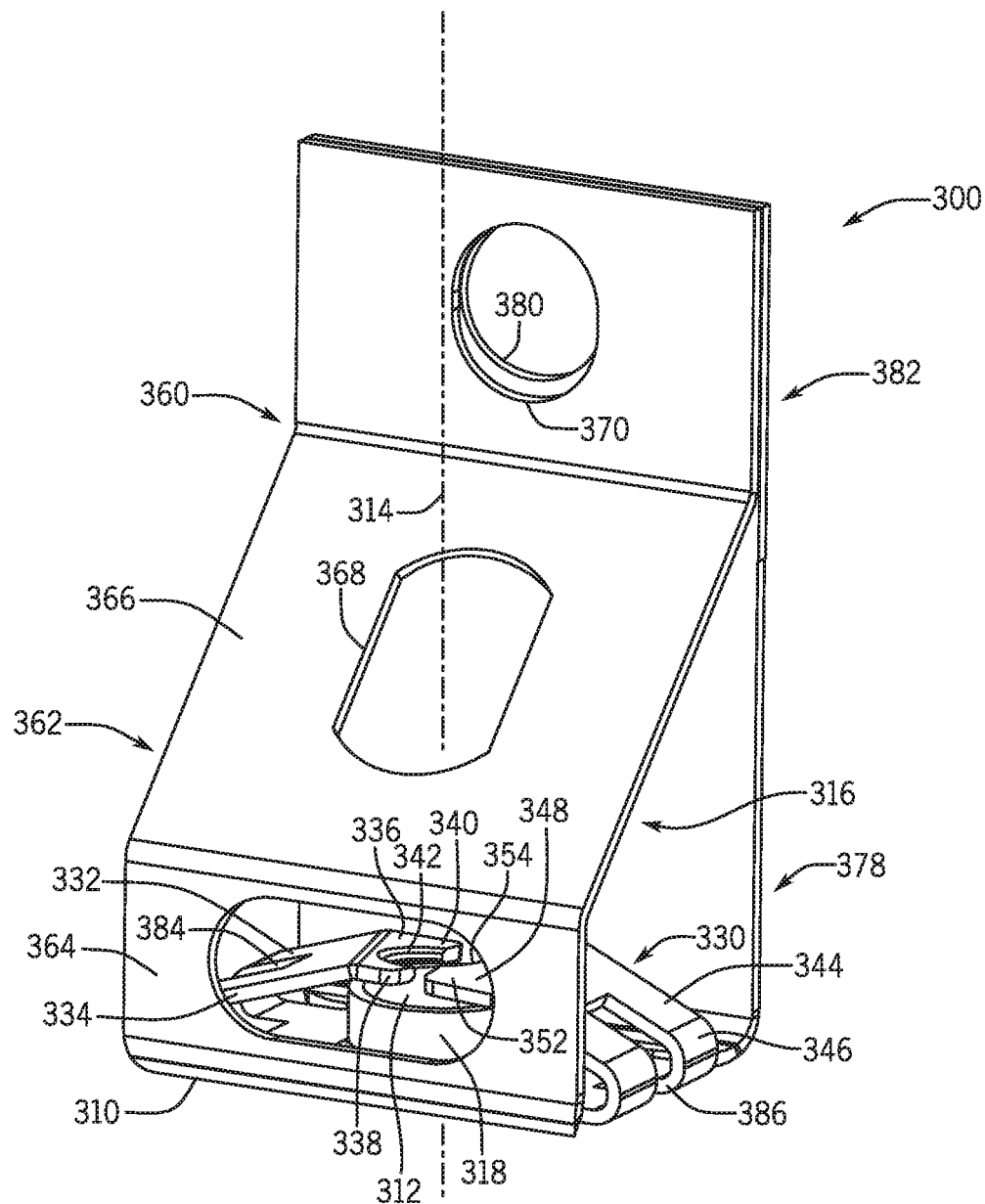
FIG. 18 is a top, front, right isometric view of a spring nut according to another embodiment of the invention.

FIGS. 18-20 illustrate a spring nut 300 according to an embodiment of the invention. In many aspects, the spring nut 300 is similar to the spring nut 100 described above and similar numbering in the 300 series is used for the spring nut 300. For example, the spring nut 300 has a base 310, a thread-engaging mechanism 330 with a first resilient arm 332 and a second resilient arm 344, and a structure-engaging portion 360 with a first tab 362 and a second tab 378. And the first and second resilient arms 332, 344 share similar features as the first and second resilient arms 132, 144 of the spring nut 100: for example, the first resilient arm 332 includes a first connecting portion 334 and a first thread-engaging end 336 with a first leading edge 338, a first trailing edge 340, and a first curved edge 342 and the second resilient arm 344 includes a second connecting portion 346 and a second thread-engaging portion 348 with a second leading edge 350, a second trailing edge 352, and a second curved edge 354. Continuing, the base 310 has an aperture 312 with a central axis 314 and a central passage 316 and an annular flange 318 that extends around the periphery of the aperture 312. Further, the first tab 362 has a vertical portion 364 and a transverse portion 366 with an aperture 368; and the first and second tabs 362, 378 overlap to provide an engagement portion 382 with aligned holes 370, 380.

In some aspects, however, the spring nut 300 differs from the spring nut 100. Although the first and second resilient arms 332, 344 share similar features as the first and second resilient arms 132, 144 of the spring nut 100, the geometries differ in some respects. For example, the first and second connecting portions 334, 346 of the first and second resilient arms 332, 344 first extend laterally outward from the base 310 in opposite directions, then extend upwardly and inwardly toward the central axis 314 at an angle from the base 310 that is smaller than that shown for the first and second resilient arms 132, 144 (see, e.g., FIG. 5). Further, each of the first and second resilient arms 332, 344 has a slot 384, 386 extending along the first and second connecting portions 334, 346. The slots 384, 386 reduce the rigidity of the first and second arms 332, 344 in the upward direction when receiving a threaded object and in the downward direction when a load is applied to the threaded object, thus potentially increasing the ease of insertion of a threaded object.

Additionally, the annular flange 318 extends away from the base 310 a greater distance than the annular flange 118 of the spring nut 100. Correspondingly, when a load is applied to a retained threaded object, the load can urge the first and second resilient arms 332, 344 against the annular flange 318 and at least some of the load can be transferred from the first and second arms 332, 344 to the annular flange 318. It is further contemplated that the annular flange 318 can be shaped to mirror the geometry of the first and second thread-engaging ends 336, 348: i.e., the annular flange 318 can angle generally downwardly at the same angle as the first thread-engaging end 336 angles generally downwardly toward the second tab 378 and generally downwardly at the same angle as the second thread-engaging end 348 angles generally downwardly away from the second tab 378. The mirrored geometry of the annular flange 318 can more evenly support the load transferred from the first and second resilient arms 332, 344.

Additionally, or alternatively, an annular flange of a spring nut can approximately match a thread pitch of a retained threaded object. For example, with reference to FIGS. 21 and 22, a spring nut 400 according to another embodiment has an annular flange 418 with a varying extrusion height as it extends from around an aperture 412 in a base 410. The annular flange 418 is positioned under each of first and second resilient arms 432, 444 and configured to provide support to both of the first and second resilient arms 432, 444 substantially equally when a threaded object is received and placed under load.

The spring nut 400 is otherwise similar to the spring nut 100 described above and similar numbering in the 400 series is used for the spring nut 400. For example, the spring nut 400 has a thread-engaging mechanism 430 with a first resilient arm 432 and a second resilient arm 444, and a structure-engaging portion 460 with a first tab 462 and a second tab 478. And the first and second resilient arms 432, 444 share similar features as the first and second resilient arms 132, 144 of the spring nut 100: for example, the first resilient arm 432 includes a first connecting portion 434 and a first thread-engaging end 436 and the second resilient arm 444 includes a second connecting portion 446 and a second thread-engaging portion 448, and each of the first and second resilient arms 332, 344 has a slot 384, 386 extending along the first and second connecting portions 334, 346. Continuing, the base 410 has a central passage 416 in which a threaded object can be received. Further, the first tab 462 has a vertical portion 464 and a transverse portion 466 with an aperture 468; and the first and second tabs 462, 478 overlap to provide an engagement portion 482 with aligned holes 470, 480.

Figure 23:
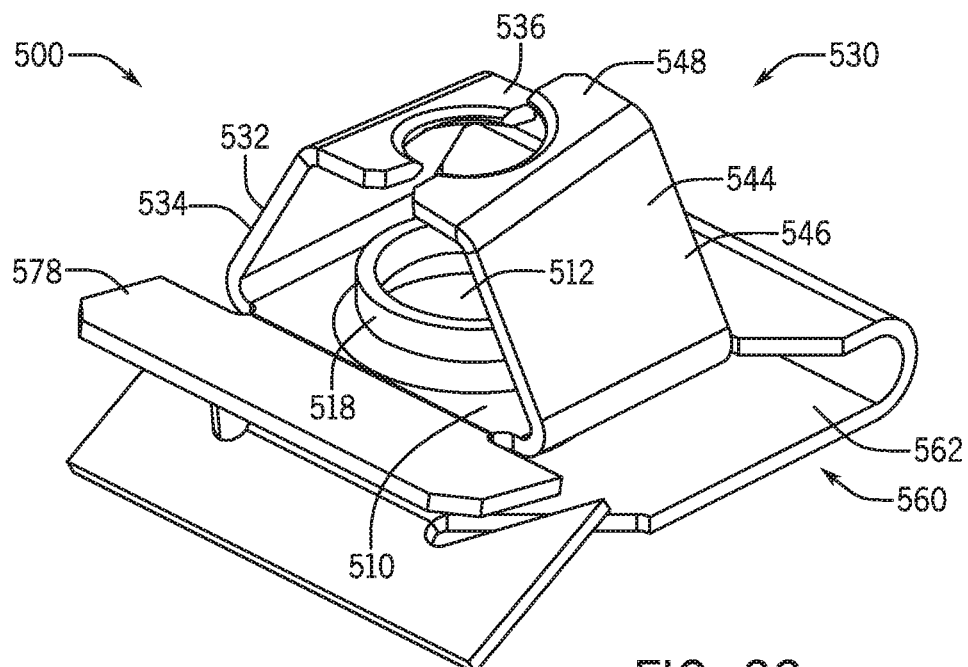
FIG. 23 is a top, front, right isometric view of a spring nut according to another embodiment of the invention.
Figure 24:
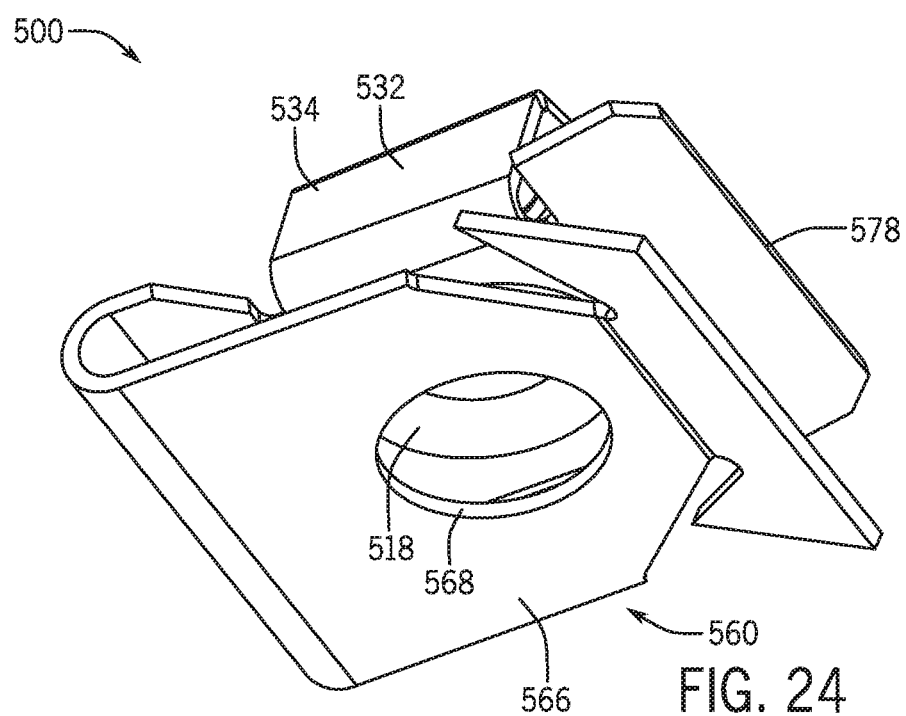
FIG. 24 is a bottom, front, left isometric view of the spring nut of FIG. 23.

As stated above, in other embodiments, other configurations are possible, including configurations in which different structure-engaging features are provided or in which a base is otherwise supported. FIGS. 23 and 24 illustrate a spring nut 500 according to such another embodiment of the invention. In many aspects, the spring nut 500 is similar to the spring nut 100 described above and similar numbering in the 500 series is used for the spring nut 500. For example, the spring nut 500 has a base 510 and a thread-engaging mechanism 530 with a first resilient arm 532 and a second resilient arm 544. The first and second resilient arms 532, 544 share similar features as the first and second resilient arms 132, 144 of the spring nut 100: for example, the first resilient arm 532 includes a first connecting portion 534 and a first thread-engaging end 536 and the second resilient arm 544 includes a second connecting portion 546 and a second thread-engaging portion 548. Continuing, the base 510 has an aperture 512 and an annular flange 518 that extends around the periphery of the aperture 512. Further, the first tab 362 has a vertical portion 364 and a transverse portion 366 with an aperture 368; and the first and second tabs 362, 378 overlap to provide an engagement portion 382 with aligned holes 370, 380.

In some aspects, however, the spring nut 500 differs from the spring nut 100. A structure-engaging portion 560 includes a first tab 562 extending integrally from the base 510 and a second tab 578 also extending integrally from the base 510 opposite the first tab 562. The first tab 562 has a transverse portion 566 that extends substantially parallel with and underneath the base 510 and has an aperture 568 axially aligned with the aperture 512 through which a threaded rod may pass. The second tab 578 extends at an angle from the base 510 and, along with the first tab 562, can be configured to encourage receipt of a support structure between the base 510 and the first tab 562. A threaded object received within the spring nut 500 can further tighten the spring nut 500 to the support structure. Other configurations are further contemplated. For example, in some embodiments only one structure-engaging feature (e.g., only a first or a second tab) can extend from a base.

In other embodiments, other configurations are possible, including configurations in which different structure-engaging features are provided or in which a base is otherwise supported. For example, in some embodiments, only one structure-engaging feature (e.g., only a first or a second tab) can have a mounting feature (e.g., a mounting hole). In such a case, for example, in a spring nut otherwise configured similarly to the spring nut 100, other structure-engaging features (e.g., the other tab) can attach above or below the mounting feature of the first or second tab. In some embodiments, first and second tabs can both extend inwards towards a central axis and engage (e.g., contact) each other to form an engagement feature along or adjacent to the central axis.

In the discussion above, certain embodiments exhibit features that are different from features of other embodiments. Generally, features described with respect to one embodiment above can be interchanged with features of other embodiments, or added as supplemental features to other embodiments. For example, a wedge element feature similar to the wedge element 172 (see FIG. 1) or a lengthened annular flange or other collar similar to the flange 318 (see FIG. 18) can be used with other configurations. Similarly, particular angular configurations, internal features (e.g., slots or apertures), and other features described above can be generally be included on any variety of embodiments other than those with which such configurations or features are specifically illustrated or described above.

Thus, embodiments of the invention provide a spring nut for attachment to a threaded object. The improved spring nut can provide increased ease and safety of installation. Further, some embodiments of the invention provide a wedge element configured to force the first and second resilient arms away from each other to release a threaded object installed therebetween without requiring rotation of the threaded object. In some embodiments, a spring nut can be manufactured as an integral whole, from single pieces of stamped spring steel or metal. In some configurations, this can substantially simplify required manufacturing by reducing the need for secondary machining and assembly processes.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A spring nut for attaching a threaded object to a structure, the spring nut comprising:
    a base;
    a first arm and a second arm extending from the base, the first and second arms configured to receive the threaded object without rotation of the threaded object and to retain the threaded object therebetween;
    a first tab and a second tab extending from the base opposite one another and adjacent the first and second arms, the first tab having a vertical portion that extends substantially perpendicular and axially away from the base to a transverse portion that angles over the first and second arms toward the second tab; and
    a wedge element coupled to the first tab, the wedge element extending outward from the transverse portion, beyond the vertical portion, and bending back toward the first and second tabs and the base, the wedge element being configured to selectively operatively urge the first and second arms apart to release the threaded object from being retained between the first and second arms.

2. The spring nut of claim 1, wherein the base, the first and second arms, and the wedge element are unitarily formed from a single piece of material.

3. The spring nut of claim 1, wherein the first and second arms are configured to impart an inward force on the threaded object received therebetween and the wedge element is configured to impart an outward force upon the first and second arms, opposite the inward force.

4. The spring nut of claim 1, wherein the wedge element has a curved profile that is shaped to receive the threaded object as the wedge element urges the first and second arms apart.

5. The spring nut of claim 1, wherein the wedge element has an angled distal portion configured to increasingly urge apart the first and second arms as the wedge element is forced toward the threaded object.

6. The spring nut of claim 1, wherein the base includes an aperture through which the threaded object can be received, the aperture defining a central axis; and
    wherein the first and second arms are configured to flex resiliently away from the threaded object as the threaded object is inserted, without rotation, through the aperture in a first axial direction along the central axis, and to retain the threaded object against movement in a second axial direction opposite the first axial direction.

7. The spring nut of claim 6, further comprising an annular flange extending upward from the base around the aperture.

8. The spring nut of claim 7, wherein the annular flange extends upward at least one thread pitch of the threaded object.

9. A spring nut for attaching a threaded object to a structure, the spring nut comprising:
    a base;
    one or more arms extending from the base, the one or more arms being configured to receive the threaded object without rotation of the threaded object, to retain the threaded object against axial movement in a first direction;
    a tab extending from the base, the tab configured to be affixed to the structure to induce a force upon the base in the opposite direction of a force induced upon the base by a retained threaded object; and
    a wedge, supported relative to the tab and the base, the wedge being configured to be selectively operatively engaged with the one or more arms to release the threaded object.

10. The spring nut of claim 9, wherein the base, the one or more arms, the wedge, and the tab are unitarily formed from a single piece of material.

11. The spring nut of claim 10, wherein the wedge is cantilevered from above the one or more arms.

12. The spring nut of claim 9, wherein the wedge has a curved profile that is shaped to receive the threaded object as the wedge engages with the one or more arms.

13. A spring nut for attaching a threaded object to a structure, the spring nut comprising:
- a first arm and a second arm extending from a base in a first direction and angled toward each other, the first and second arms configured to engage the threaded object; and
- a third arm extending toward the base from an anchor point that is opposite the first and second arms from the base in the first direction, the third arm configured to be moved to release the threaded object from being retained between the first and second arms;
- the first, second, and third arms unitarily formed from a single piece of material.

14. The spring nut of claim 13, wherein the anchor point for the third arm is located above the first and second arms.

15. The spring nut of claim 13, wherein the third arm has a distal portion that is configured to provide an outward lateral force and an axial force on the first and second arms.

16. The spring nut of claim 15, wherein the distal portion is angled to gradually increase the outward lateral force as the third arm is moved towards the first and second arms.

17. The spring nut of claim 15, wherein the distal portion has a curved profile that is shaped to receive the threaded object as the third arm engages the first and second arms.

18. The spring nut of claim 13, further comprising a structure-engaging portion integrally formed with the first, second, and third arms, the structure-engaging portion configured to be affixed to the structure.

19. The spring nut of claim 18, wherein the third arm extends from the structure-engaging portion.

20. The spring nut of claim 18, wherein the structure-engaging portion is configured to induce a force upon the first and second arms in an opposite direction of a force induced upon the first and second arms by a retained threaded object.

* * * * *